United States Patent
Fellman et al.

(10) Patent No.: US 6,215,797 B1
(45) Date of Patent: Apr. 10, 2001

(54) METHODS AND APPARATUS FOR PROVIDING QUALITY OF SERVICE GUARANTEES IN COMPUTER NETWORKS

(75) Inventors: Ronald D. Fellman; Rene L. Cruz, both of San Diego, CA (US)

(73) Assignee: Path 1 Technologies, Inc., San Diego, CA (US)

( * ) Notice: Subject to any disclaimer, the term of this patent is extended or adjusted under 35 U.S.C. 154(b) by 0 days.

(21) Appl. No.: 09/136,706

(22) Filed: Aug. 19, 1998

(51) Int. Cl.[7] .................................................. H04J 3/06
(52) U.S. Cl. ............................ 370/503; 370/419; 370/465
(58) Field of Search .................................. 370/503, 257, 370/258, 270, 294, 340, 341, 345, 350, 392, 395, 400, 416, 420, 421, 423, 424, 426, 428, 437, 442, 443, 445, 450, 451, 453, 454, 457, 460, 461, 465, 468, 470, 493, 419

(56) References Cited

U.S. PATENT DOCUMENTS

| | | | |
|---|---|---|---|
| 4,412,326 | 10/1983 | Limb | 370/85 |
| 4,581,735 | 4/1986 | Flamm et al. | 370/85 |
| 4,682,324 | 7/1987 | Ulug | 370/85 |
| 5,289,466 | 2/1994 | Nobutoki et al. | 370/85.2 |
| 5,307,350 | 4/1994 | McIntyre | 370/85.3 |
| 5,381,413 * | 1/1995 | Tobagi et al. | 370/448 |
| 5,434,861 | 7/1995 | Pritty et al. | 370/85.8 |
| 5,436,903 | 7/1995 | Yang et al. | 370/85.3 |
| 5,485,147 | 1/1996 | Jaffe et al. | 340/825.5 |
| 5,490,143 | 2/1996 | Hara et al. | 370/85.2 |
| 5,526,344 * | 6/1996 | Diaz et al. | 370/364 |
| 5,526,355 | 6/1996 | Yang et al. | 370/85.3 |
| 5,528,513 | 6/1996 | Vaitzblit et al. | 364/514 A |
| 5,559,796 | 9/1996 | Edem et al. | 370/60 |
| 5,604,742 * | 2/1997 | Colmant et al. | 370/396 |
| 5,615,211 * | 3/1997 | Santore et al. | 370/419 |
| 5,648,958 * | 7/1997 | Counterman | 370/458 |
| 5,648,959 * | 7/1997 | Ilyadis et al. | 370/445 |
| 5,668,811 | 9/1997 | Worsley et al. | 370/424 |
| 5,684,802 | 11/1997 | Perreault et al. | 370/448 |
| 5,717,855 * | 2/1998 | Norman et al. | 709/250 |
| 5,732,094 * | 3/1998 | Petersen et al. | 370/445 |
| 5,761,430 | 6/1998 | Gross et al. | 395/200.55 |
| 5,762,431 | 6/1998 | Gross et al. | 395/200.55 |
| 5,764,895 * | 6/1998 | Chung | 709/250 |
| 5,796,738 * | 8/1998 | Scott et al. | 370/401 |
| 5,878,232 | 3/1999 | Marimuthu | 709/249 |
| 5,903,774 * | 5/1999 | Hannah | 710/29 |
| 5,905,869 | 5/1999 | Hornung et al. | 709/228 |
| 5,953,344 * | 9/1999 | Dail et al. | 370/443 |
| 5,954,796 * | 9/1999 | McCarty et al. | 370/241 |
| 5,960,001 * | 9/1999 | Shaffer et al. | 370/448 |
| 6,052,375 * | 4/2000 | Bass et al. | 370/412 |

* cited by examiner

Primary Examiner—Dang Ton
Assistant Examiner—Phirin Sam
(74) Attorney, Agent, or Firm—Fish & Richardson PC

(57) ABSTRACT

An arbitration mechanism provides quality of service guarantees for time-sensitive signals sharing a local area computer network with non-time-sensitive traffic. Device adapters are placed at all access points to an Ethernet network. The device adapters limit admission rates and control the timing of all packets entering the network. By doing so, collisions are eliminated for time-sensitive traffic, thereby guaranteeing timely delivery. A common time reference is established for the device adapters. The time reference includes a frame with a plurality of phases. Each of the phases is assigned to a device adapter. Each device adapter is allowed to transmit packets of data onto the network only during the phase assigned thereto. The length of the phases may be modified in accordance with the number of packets to be transmitted by a particular device adapter.

42 Claims, 18 Drawing Sheets

METHODS AND APPARATUS FOR PROVIDING QUALITY OF SERVICE GUARANTEES IN COMPUTER NETWORKS

FIELD OF THE INVENTION

The present invention is related to computer networks and, more particularly, to network apparatus and associated methods that allows real-time traffic such as telephone and video to share a computer network with non-real-time traffic. The methods and apparatus of the present invention provide quality-of-service latency and bandwidth guarantees for time-sensitive signals sharing, for example, an Ethernet network with non-time sensitive signals.

BACKGROUND OF THE INVENTION

Computer telephony, that is, the delivery of telephone calls over computer networks, has recently become a focus of attention due to the potential cost savings of sharing these modern high-bandwidth facilities for multiple uses. Because computer networks packetize signals and then mix such packetized signals (or more simply, packets) from many sources over a single link, networks can make more efficient use of communications resources than conventional circuit-switched telephone systems. Furthermore, computer networks leverage the mass-production cost savings and technological advances of commodity products. This sharing of computer communications for non-computer signals therefore has the potential to greatly lower the cost of communications when used with telephone signals.

Computer network traffic from telephone, video, and other time-sensitive sources are generally referred to as real-time traffic because such traffic must arrive at a destination within a specified deadline. Real-time traffic generated from audio or video sources are usually generated in equally spaced time intervals. This type of periodic real-time traffic is referred to as isochronous traffic.

When isochronous traffic is digitized and combined with the sophisticated computer-processing compression techniques, the result is a significant reduction in bandwidth requirements. This use of computer technology to send telephone and video signals thereby results in even further cost savings.

However, conventional computer networks are not designed to handle real-time traffic. Collisions and congestion can induce delays and retransmissions, and can cause real-time traffic, such as video, audio, telemetry and control signals, to arrive late at a destination, thereby missing a deadline. Furthermore, such collision-induced delays are stochastic by nature and therefore unpredictable. Isochronous traffic sources become bursty after traveling through such networks. As a result, the quality of telephone calls placed over the Internet and computer networks in general is very poor at present.

Ethernet computer networks, in particular, use a form of media access control known as Carrier Sense Multiple Access with Collision Detect (CSMA/CD), also sometimes known as Aloha. This protocol is described in detail by the IEEE Standard 802.3. It provides a very simple and effective mechanism for allowing multiple packet sources to share a single broadcast computer network medium. To transmit a new packet, a transmitter need only sense that no packet is currently being transmitted by listening to the network. As a transmitted packet is broadcast to all receivers on the local network, listening to the network for activity is trivial. If a transmitter wishing to send a packet senses that a packet is currently being transmitted, then the transmitter defers transmission until it senses that the network is inactive. Collisions naturally arise as part of this mechanism. The most common scenario leading to a collision is where two or more stations, which are deferring their own respective transmissions during the transmission of another packet, sense a lack of activity at nearly the same time. The protocol detects collisions, and then aborts and reschedules transmission of all packets for a random time later. This protocol, while simple and effective for computer traffic, introduces collisions and delays as part of its natural operation. In fact, overloading such a network causes the entire network to become unusable, resulting in a significant reduction in throughput.

Although Ethernet is now ubiquitous throughout the Internet within local-area computer networks, or intranets, the use of variable packet sizes and Carrier Sense Multiple Access with Collision Detect for link access and control creates an even less predictable and less controllable environment for guaranteeing quality of service for wide-area real-time traffic that must traverse a plurality of Ethernet networks in order to reach a final destination.

DESCRIPTION OF RELEVANT PRIOR ART

A conventional Ethernet network 1 is shown in FIG. 1a. Conventional Ethernet devices 100, such as personal computers and printers, generate non-real-time traffic and are referred to herein as Non-Real-Time Devices (NRTDs). The NRTDs 100 have a standard Ethernet interface and attach to the conventional Ethernet network 1 through Network Interface Points 2. The Network Interface Points 2 could represent a 10BaseT port, a 100BaseT port, a 10Base2 (ThinLAN) port, for example. The Network Interface Points 2 may be interconnected by Repeaters or Ethernet Hubs 3.

In conventional Ethernet networks, the attached devices 100 are called stations. When a station transmits a packet on the network, the signal is broadcast throughout the network. For a transmission to be successfully received by another station, there must be no other simultaneous transmissions. Thus, an arbitration mechanism to share the network is required. Ethernet networks use an arbitration mechanism known Carrier Sense Multiple Access with Collision Detect (CSMA/CD).

FIG. 1b provides an example that illustrates how the CSMA/CD protocol works. A time line of events is illustrated, representing the actions of five stations, labeled Station A, Station B, Station C, Station D, and Station E. These five stations could represent the five NRTDs in FIG. 1a, for example. In this example, Station A transmits a packet 10 on the network after sensing that the network is idle. During the transmission of this packet 10, Station B generates a packet 12 to transmit on the network, but defers the transmission (indicated by numeral 11) because Station B senses activity on the network, due to the transmission 10 from Station A. As soon as Station B senses that the network is idle, Station B waits an additional amount of time, known as the Inter-Packet Gap (IPG) 19, prior to transmitting a packet onto the network. In 10Mbit/sec Ethernet networks, for example, IPG is defined to be 9.6 microseconds, or 96 times. This constraint results in a minimum time spacing between packets. After Station B waits for an additional IPG seconds, it transmits the queued packet 12. Accordingly, by sensing the network for activity, collisions can be avoided. Collisions, which occur when two or more stations transmit simultaneously on the network, are still possible, however, due to non-zero latency of detecting the state of the network and non-zero propagation delay of signals between the stations.

As shown in FIG. 1b, for example, after Station B finishes transmitting a packet 12, the network becomes idle. Sometime later, Station C transmits a packet 13 on the network after sensing that the network is idle. During this transmission from Station C, both Stations D and E each happen to generate a packet for transmission onto the network. As activity is detected on the network, due to the transmission 13 from Station C, Stations D and E defer their respective transmissions (indicated by numerals 14 and 15) until the network is sensed idle. Stations D and E will sense that the network is idle at nearly the same time and will each wait an additional IPG 19 before transmitting their respective packets. Station D and Station E will then start transmitting packets on the network at nearly the same time, and a collision 16 then occurs between Station D and station E. The second station to start transmitting during the collision, say Station E, may or may not be able to detect the beginning of the transmission from the first station that starts transmitting, say Station D. In the latter case, Station E does not know that a collision will occur when beginning transmission. In the former case, Station E is still allowed to start transmitting the packet, even though Station E "knows" that transmission will cause a collision, as long as no activity is detected during the first $2/3$ of the IPG. This provision provides a degree of fairness in preventing certain stations from monopolizing the network, due to timing differences across stations or location dependent factors. During the initial part of the transmissions from Stations D and E, both stations sense that a collision 16 occurs, continue to transmit for 32 bit times, and then abort the transmission. The process of prolonging the collision for 32 bit times is called "jamming," and serves the purpose of ensuring that all stations involved in a collision will detect that a collision has in fact occurred. By aborting transmission after the "jamming" process, the network becomes idle sooner than otherwise. After a station involved in a collision aborts transmission, such a station waits a random amount of time before attempting to transmit again. If the stations involved in the collision wait for different amounts of time, another collision is avoided.

The process of waiting a random amount of time until attempting transmission again, after aborting a transmission due to a collision, is called "backing off." The CSMA/CD protocol uses a backing-off mechanism known as binary exponential back off, which is now described. A slot time T is defined to be 512 bit times. For example, in 10Mbit/s Ethernet networks, slot time T is approximately 50 microseconds. After a station experiences k collisions for a given packet it is attempting to transmit, the station waits for a time iT before attempting to transmit again, where i is a random integer in the range $0 \leq i < 2^m$ and m=min(k, 10). Notice that for a packet experiencing multiple collisions, the average waiting time after each collision doubles until 10 collisions have occurred. After 16 collisions, the station will discard the packet. Such a process provides a mechanism for dynamic load adjustment—many collisions imply a congested network, so the rate of retransmissions is reduced to decrease the probability of further collisions.

After backing off, a station again senses the network for activity, deferring if necessary before transmitting again. For example, as shown in FIG. 1b, while Station D is backing off (indicated by numeral 17), Station F generates and transmits a packet 18 after detecting that the network is idle. When through backing off, Station D senses activity on the network, due to the transmission 18 from Station F, and thus defers 21 retransmission of the packet. After sensing that the network is idle, Station D then retransmits 22 the original packet that collided earlier, after waiting for IPG 19 seconds. In this example, State E backs off (indicated by numeral 20) for a longer amount of time, and when Station E is through backing off, Station E senses that the network is idle. Station E then retransmits 23 the packet that collided earlier. Finally, in this example, Station C generates another packet 25 during the retransmission 23 of the packet from Station E, and Station C defers 24 transmission until IPG 19 after Station E completes retransmission.

As discussed earlier, a feature of CSMA/CD is simplicity. However, as noted earlier, packet delays with CSMA/CD are unpredictable and highly variable, making CSMA/CD unsuitable to support real-time traffic. In particular, backing off after several collisions significantly increases the latency suffered by a packet.

One variant of the Ethernet computer network, known as Isochronous Ethernet, also transmits isochronous data but uses a frame form which is not itself packetized. Thus, in Isochronous Ethernet, a special network adapter is required that fractures packets into pieces and then transmits each piece of a packet during a respective time slot of precise and fixed duration. Another specialized network adapter at the receiving end then needs to reconstruct the packet from the pieces for delivery to the device connected thereto. Thus, one drawback is that such Isochronous Ethernet network adapters are not directly compatible with conventional Ethernet network hardware, so that special equipment is required. Another drawback is that precise synchronization among the Isochronous Ethernet network adapters is crucial for this type of network to function effectively. In addition, Isochronous Ethernet uses only fixed-sized frames and time slots, so that network bandwidth may be wasted should one or more slots not be utilized.

In view of the foregoing, there is still a need in the art for network apparatus and associated methodology which overcomes the limitations of CSMA/CD and provides quality of service guarantees in computer networks.

SUMMARY OF THE INVENTION

The present invention provides network apparatus and associated methods for minimizing or substantially eliminating unpredictable delays in networks, particularly broadcast or Ethernet networks. The present invention provides an arbitration mechanism to control access to the network for time-sensitive signals and to minimize or substantially eliminate collisions. At regular intervals (or "frames"), dedicated time slots (or "phases") are defined during which real-time traffic may be transmitted. The arbitration mechanism allows the real-time traffic to arrive at its destination with a very low and predictable delay. The introduction of predictability and a tight bounding on the delay allows the network to set guarantees for service quality.

According to one aspect of the present invention, a network for communicating packets of data includes a plurality of devices, for example, real-time and non-real-time devices, and a network medium. A plurality of device adapters connects the devices to the network medium. Each device adapter includes a device interface connected to one of the devices and for receiving packets generated thereby and a network interface connected to the network medium. Each device adapter also includes a processor connected to each of the interfaces for receiving the packets from the device interface and for transmitting the packets to the network interface.

The plurality of device adapters have a common time reference. The common time reference defines a frame of time which, in turn, has a plurality of phases and repeats cyclically. Each of the phases is assigned to a respective device adapter. Each of the device adapters is allowed to transmit the packets received at the device interface during the phase assigned thereto. Accordingly, as no device adapter is able to transmit packets out of phase, collisions are eliminated for packets transmitted in the assigned phases. Another advantage is that the packets do not need to be reformatting after transmission.

Furthermore, the plurality of phases also includes a free-access phase, common to all connected device adapters, during which any of the device adapters is able to transmit packets according to, for example, the standard IEEE 802.3 CSMA/CD protocol. The device adapters may use information stored in a header of a received packet to determine whether to send a received packet in an assigned phase, or as a non-real-time packet in the common free-access phase. If a packet is sent in an assigned phase, service quality is guaranteed for the packet. Otherwise, if a packet sent in a free-access phase, the packet contends for network access along with all other device adapters.

The plurality of phases may also include a guard phase during which none of the device adapters is able to transmit packets. The guard phase compensates for variations in signal delays between the device adapters. The optional use of a guard phase and CSMA/CD protocol, even among assigned phases, eliminates the need for precise synchronization. Should the transmission time of a first packet extend beyond its assigned phase, the next assigned phase senses this transmission and defers transmission of a second packet until the first packet transmission is completed. No collisions occur among packet transmissions during assigned phases so long as the device adapters synchronize their phases to within less than the duration of a minimum-sized packet. In this way, the device adapter sending the first packet does not send out a third packet to collide with the second packet of the subsequent assigned phase. Thus, device adapters of this invention only need to be in substantial synchronization and not precise or exact synchronization. Furthermore, the guard phase at the start of a new frame provides a settling period for any queued packets from the prior free-access phase to ensure that a synchronization signal or a packet from the first assigned phase does not experience collisions.

Each of the phases has a length of time that may vary proportionally to the number of packets received at the device interface of a respective the device adapter. Accordingly, if a particular device connected to a device adapter is not generating a large number of packets, then the phase assigned to that device adapter may be shortened to eliminate idle time on the network. On the other hand, if a particular device generates a large number of packets, then the phase assigned thereto may be lengthened to accommodate the large traffic.

To minimize idle time even further, each device adapter may transmit an END signal to signify an end of the phase assigned thereto or to notify of a truncation of the phase assigned thereto. Accordingly, if the phase assigned to a particular device adapter is relatively long but if the device adapter only needs to transmit relatively few packets, then the END signal notifies the other device adapters of the premature end of the phase and allows the subsequent phase to begin.

The network of the invention may include a plurality of real-time devices, such as telephones, and non-real-time devices, such as computers. The non-real-time devices may include a number native non-real-time devices connected to the network medium directly. When there is a surplus of time to meet deadlines for real-time devices, the transmission of real-time packets may be delayed in deference to non-real-time packets generated by the native non-real-time devices. However, collisions may be forced for non-real-time packets when a scheduled real-time packet may otherwise miss a deadline.

Other aspects, features, and advantages of the present invention will become apparent to those persons having ordinary skill in the art to which the present invention pertains from the following description taken in conjunction with the accompanying drawings.

DESCRIPTION OF THE INVENTION

Figure 1A:
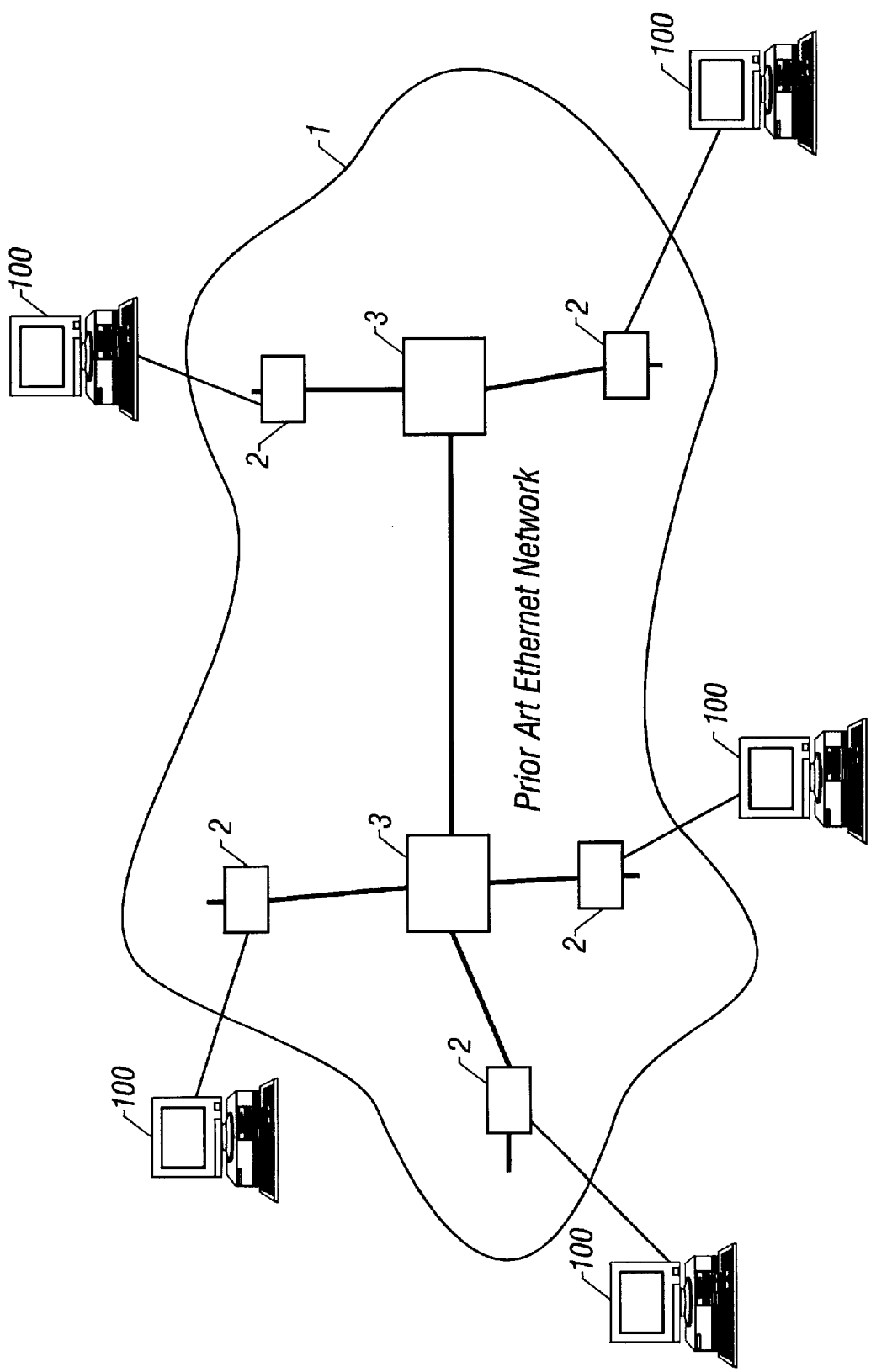
FIG. 1a is a schematic view of a conventional Ethernet network.
Figure 1B:
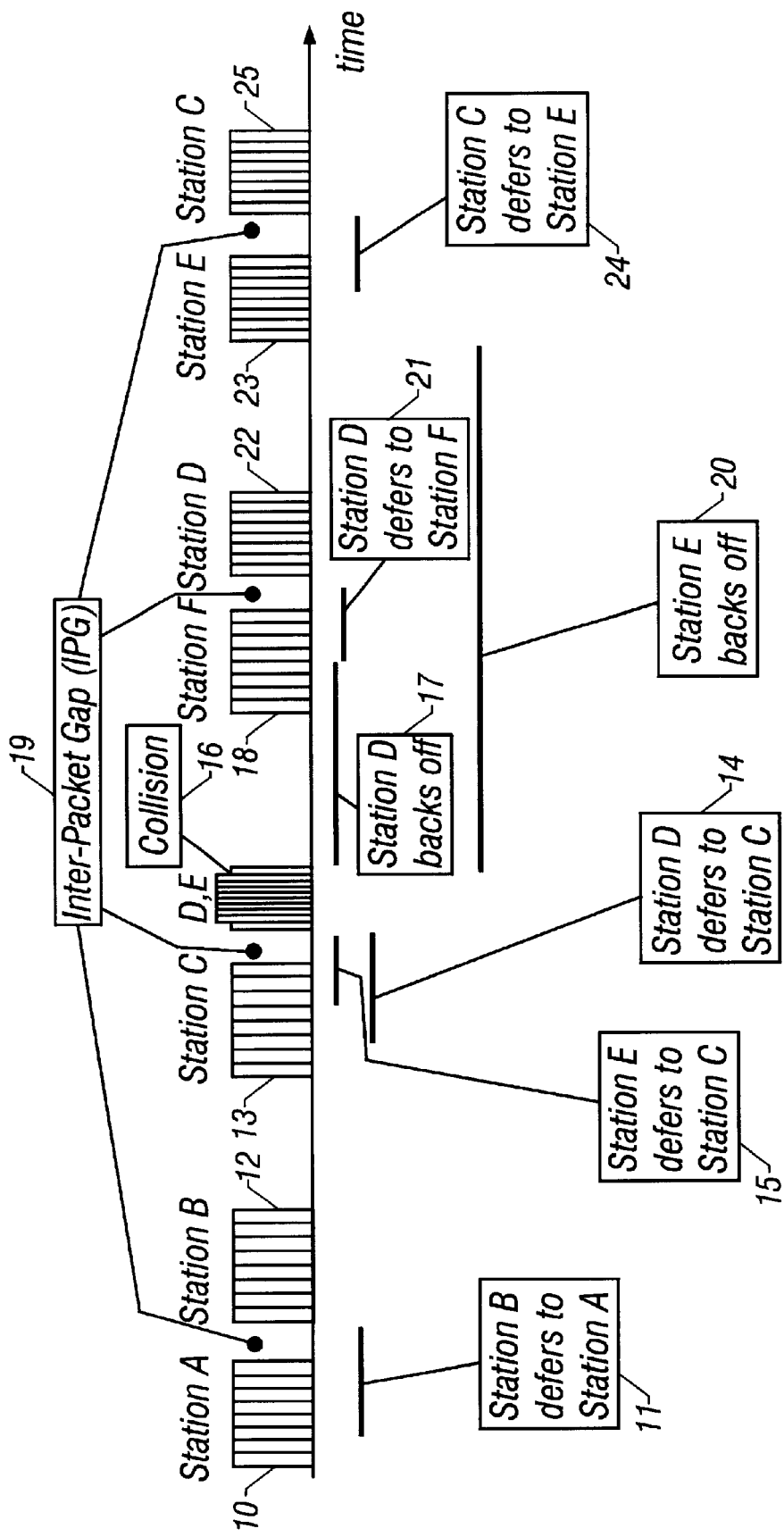
FIG. 1b is a schematic diagram illustrating a CSMA/CD arbitration mechanism in a conventional Ethernet network.
Figure 2:
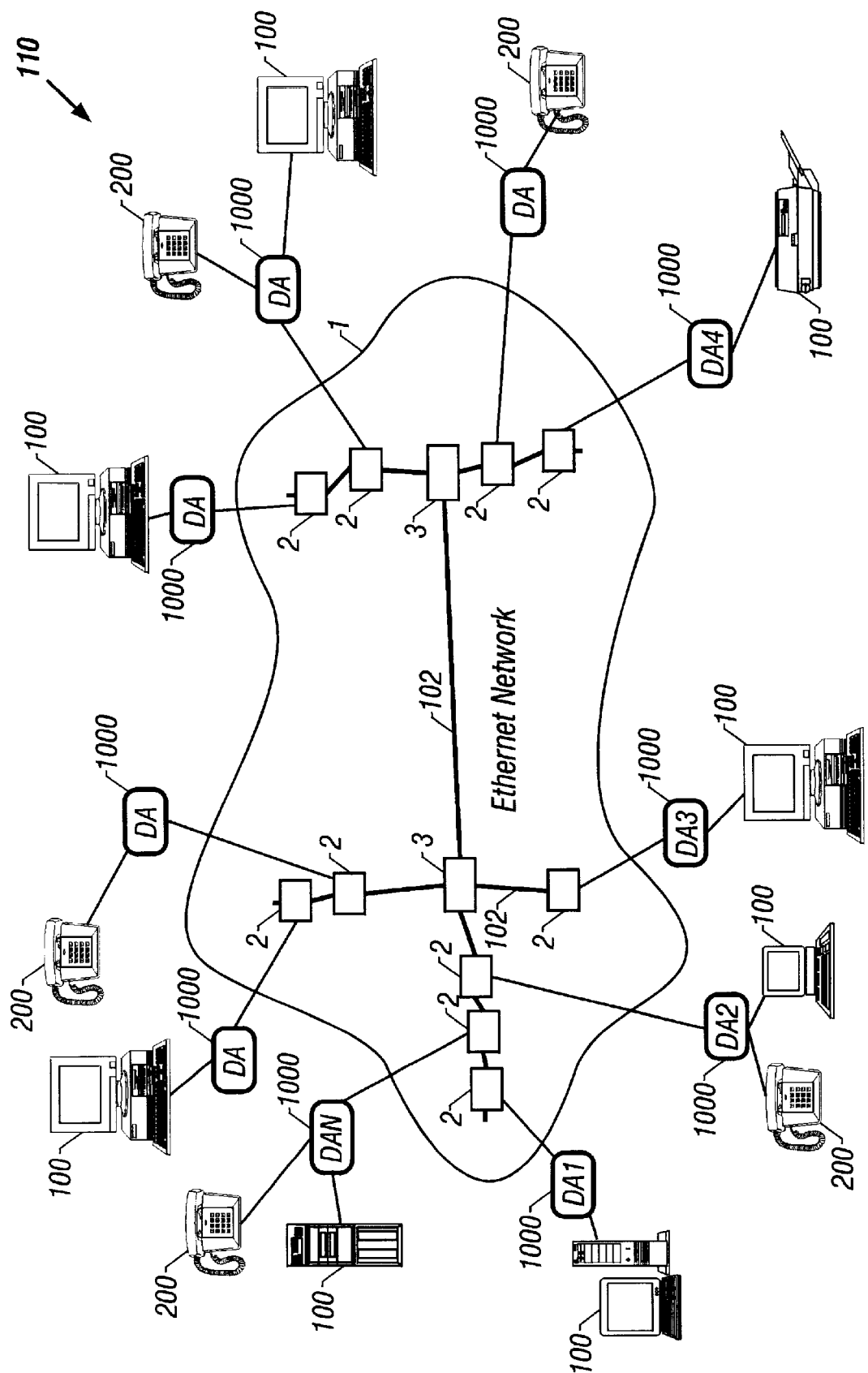
FIG. 2 is a schematic view of an exemplary Ethernet network in accordance with the present invention, particularly illustrating a Conditioned Mode of the network, in which real-time devices and conventional Ethernet devices are attached to the Ethernet network.

Referring to the drawings in more detail, an enhanced network 110 in accordance with the present invention is illustrated in FIG. 2. As will be discussed in more detail below, exemplary network 110 includes a plurality of devices 100 and 200 for generating real-time and/or non-real-time packets of data for transmission across a network medium 112 to a destination on the network 110. Exemplary network 110 also includes a plurality of device adapters (DAs) 1000 which ensure that at least the real-time packets arrive at their destination without colliding with other packets, thus guaranteeing a quality of service unavailable with conventional computer networks.

In addition to the hardware associated with the network 110, the present invention provides an arbitration mechanism to control access to the network for time-sensitive signals and to minimize or substantially eliminate collisions. As discussed in more detail below, at regular intervals (or "frames"), dedicated time slots (or "phases") are defined during which real-time traffic may be transmitted. The arbitration mechanism allows the real-time traffic to arrive at its destination with a very low and predictable delay. The introduction of predictability and a tight bounding on the delay allows the network to set guarantees for service quality.

Continuing to reference FIG. 2, the plurality of device adapters 1000 are connected to the network 110 at network interface points 2. Real-time devices (RTDs) 200, such as telephones and video equipment, are attached to the device adapters 1000. Non-real-time devices (NRTDs) 100, which are attached directly to network interface points in conventional networks, are preferably connected to the device adapters 1000 in accordance with the present invention. The network 110 shown in FIG. 2 is configured in "Conditioned Mode," as all traffic placed on the network is conditioned by the device adapters 1000. The network includes another mode, called "Annex Mode," which will be discussed in more detail below.

The network 110 may include a broadcast portion 1 operating in accordance with a Carrier Sense Multiple Access with Collision Detect (CSMA/CD) arbitration mechanism. The broadcast portion 1 is an environment in which packets generated by one station are transmitted to each of the stations on the network (i.e., packets are broadcast throughout the network). Accordingly, collisions would occur in the broadcast portion 1 if the device adapters 1000 of the present invention were not present to control the transmission of packets. The broadcast portion 1 may be an Ethernet network or another type of network generally operating in a broadcast environment.

Figure 3:
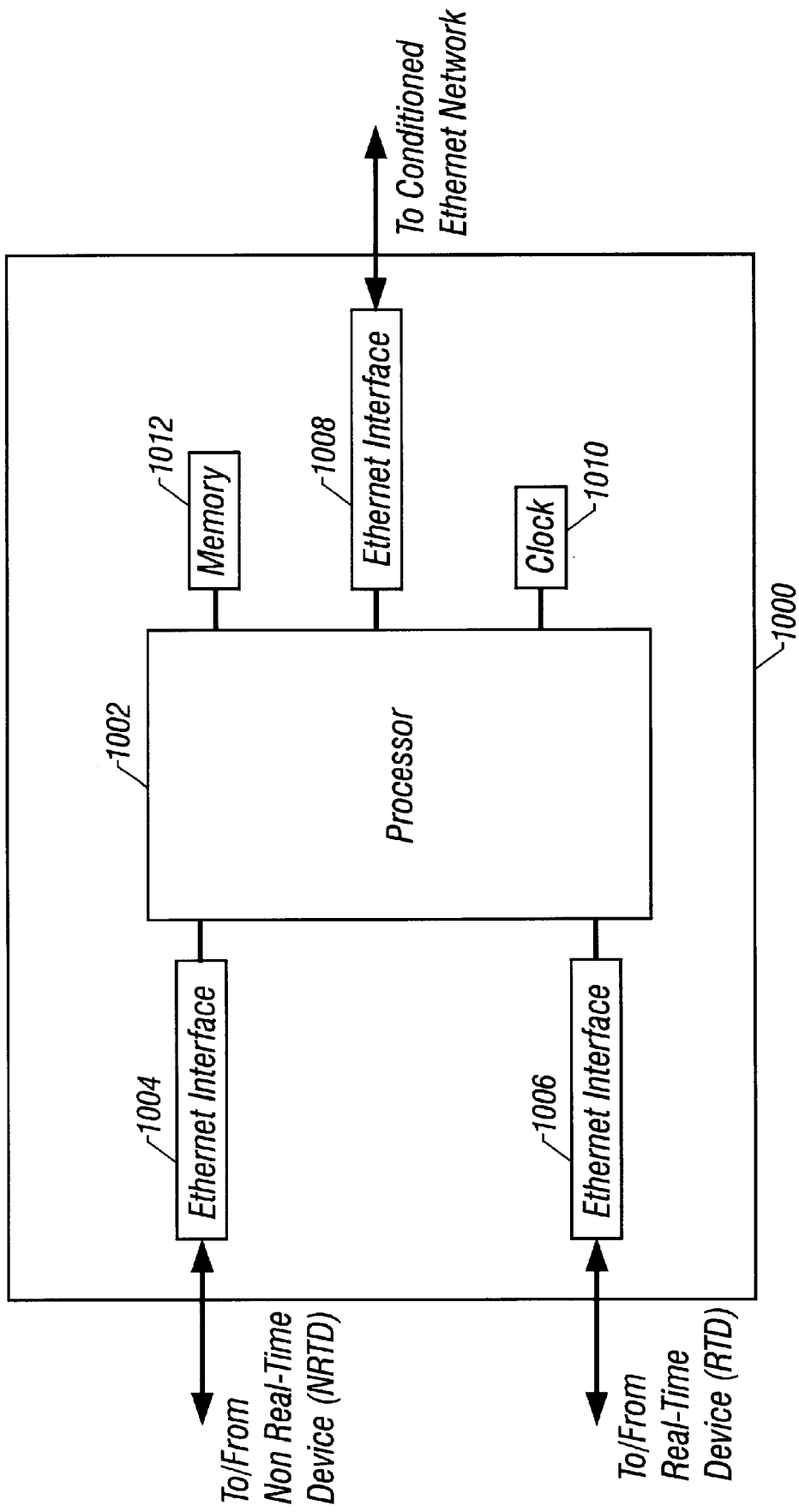
FIG. 3 is a block diagram of an exemplary device adapter of the present invention wherein two Ethernet ports, one dedicated to non-real-time traffic and another dedicated to real-time traffic, are mixed onto a third port that conditions an Ethernet link to allow a mixture of real-time and non-real-time traffic.

An exemplary embodiment of a device adapter 1000 of the present invention is illustrated in FIG. 3. Exemplary device adapter 1000 includes a processor 1002 and a plurality of interfaces 1004, 1006, and 1008. Interface 1004 is connectable to non-real-time devices 100; interface 1006 is connectable to real-time devices 200; and interface 1008 is connectable to the network 110. Each device adapter 1000 may also include a local clock 1010 such as a crystal oscillator and a memory 1012. The memory 1012 is connected to and controlled by the processor 1002. In addition to the embodiment shown in FIG. 3, the memory 1012 may be connected directly to the device interfaces 1004 and 1006 or to the network interface 1008 for storing both real-time and non-real-time packets prior to transmission.

As will be discussed in more detail below, the processor 1002 operates in accordance with an arbitration mechanism that substantially eliminates collisions of real-time traffic. The device adapters 1000 may be configured as stand-alone devices which may be connected to the network medium 112, the real-time devices 100, and the non-real-time devices 200. Alternatively, the device adapters 1000 may be configured as adapter cards which may be inserted in expansion slots in, for example, computers (illustrated as NRTDs 100 in FIG. 2) connected to the network 1.

The RTDs 200 may output data across a standard Ethernet interface. Conventional telephone and video equipment may be interfaced to the device adapters 1000 through an additional device which formats the output of the conventional equipment into Ethernet packets. Such additional formatting devices may be physically incorporated into the device adapters 1000.

To make efficient use of the broadcast medium 112 of the network 110, arbitration mechanisms of the present invention provide the capability of eliminating collisions and congestion in the network. This is accomplished by establishing a common time reference among the device adapters 1000, and then using the common time reference to define periods of time when a particular device adapter has the exclusive right to transmit packets on the network.

One exemplary arbitration mechanism of the invention for obtaining a time reference is to assign one of the device adapters 100 as a master device that transmits a synchronization signal at regular intervals or periodically to synchronize the local clock 1010 of each adapter. For example, the synchronization signal may be sent every predetermined number of frames, such as every hundred frames at the start of a frame, or every predetermined amount of time, such as 12.5 ms or 25 ms.

In addition, a slave device adapter (i.e., a device adapter which is not the master device adapter) may predict or measure the drift of its local clock 1010 with respect to the clock 1010 or time signal of the master device adapter. The slave device adapter may then use this drift measurement to adjust its local clock 1010 at regular intervals between synchronization signals from the master device adapter. This technique allows the master device adapter to transmit synchronization signals at less frequent intervals yet still adequately compensate for local oscillator drift. For example, if the local clocks 1010 are crystal oscillators, then the slave device adapter may predict the drift with relative accuracy. If the drift is predicted to be about 60 $\mu$s for every second, then for a frame having a length of 25 ms, each slave device adapter would adjust its local clock by 1.5 $\mu$s per frame, or equivalently, by 60 $\mu$s after each 40 frames. If 60 $\mu$s of clock mismatch are required, then this technique may significantly extend the time interval between master synchronization signals to far longer than one second. Or alternatively, this technique may provide for a significant tolerance to loss or delay of a synchronization signal.

Alternative methods for obtaining a common time reference will be discussed below. A master device may be defined as the first of the device adapters 1000 to come on line. If a master device goes off line, then a second of the device adapters 1000 to come on line may become the new master device, and so on.

By definition, if at a given point in time the common time reference is t, then each of the device adapters 1000 knows the value of t to within a bounded error e, and the absolute value of the difference between the estimates of the common time reference at any two device adapters 1000 is upper bounded by e. For purposes of explanation, it is helpful first to assume that e=0 so that each device adapter knows the exact value of the common time reference.

Arbitration Mechanism

In contrast to conventional arbitration mechanisms, the present invention provides a mechanism in which repeating periodic frames are defined. Each of the frames has an assigned section and an unassigned (or free-access) section. Access to the assigned section is regulated and coordinated while access to the unassigned section is not. The unassigned section may operate in accordance with conventional CSMA/CD Ethernet protocol and may be used for the transmission of non-real-time packets. The assigned section is synchronized, and transmission of packets during the assigned section is coordinated among all the other devices to eliminate collisions. The assigned section is primarily reserved for real-time packets because such packets may be guaranteed with a fixed delivery time or delivery within a deadline.

An exemplary arbitration mechanism of the present invention defines repeating periodic time frames. Each time frame has an assigned (or "owned") section and an unassigned (or "free-access") section. The assigned section is divided into a plurality of phases corresponding to the plurality of device adapters 1000. Each of the phases is assigned to (that is, is owned by) one of the device adapters 1000. Each device adapter 1000 is allowed to transmit packets of date, for example, real-time packets from RTDs 200, only during its assigned (or owned) phase, and is not allowed to transmit packets during the phase assigned to another device adapter. Accordingly, collisions between packets, particularly, real-time packets is eliminated. Each device adapter 1000, however, is allowed to transmit packets during the unassigned (or free-access) phase. This exemplary arbitration mechanism will be discussed in more detail below with particular reference to FIG. 4.

Figure 4:
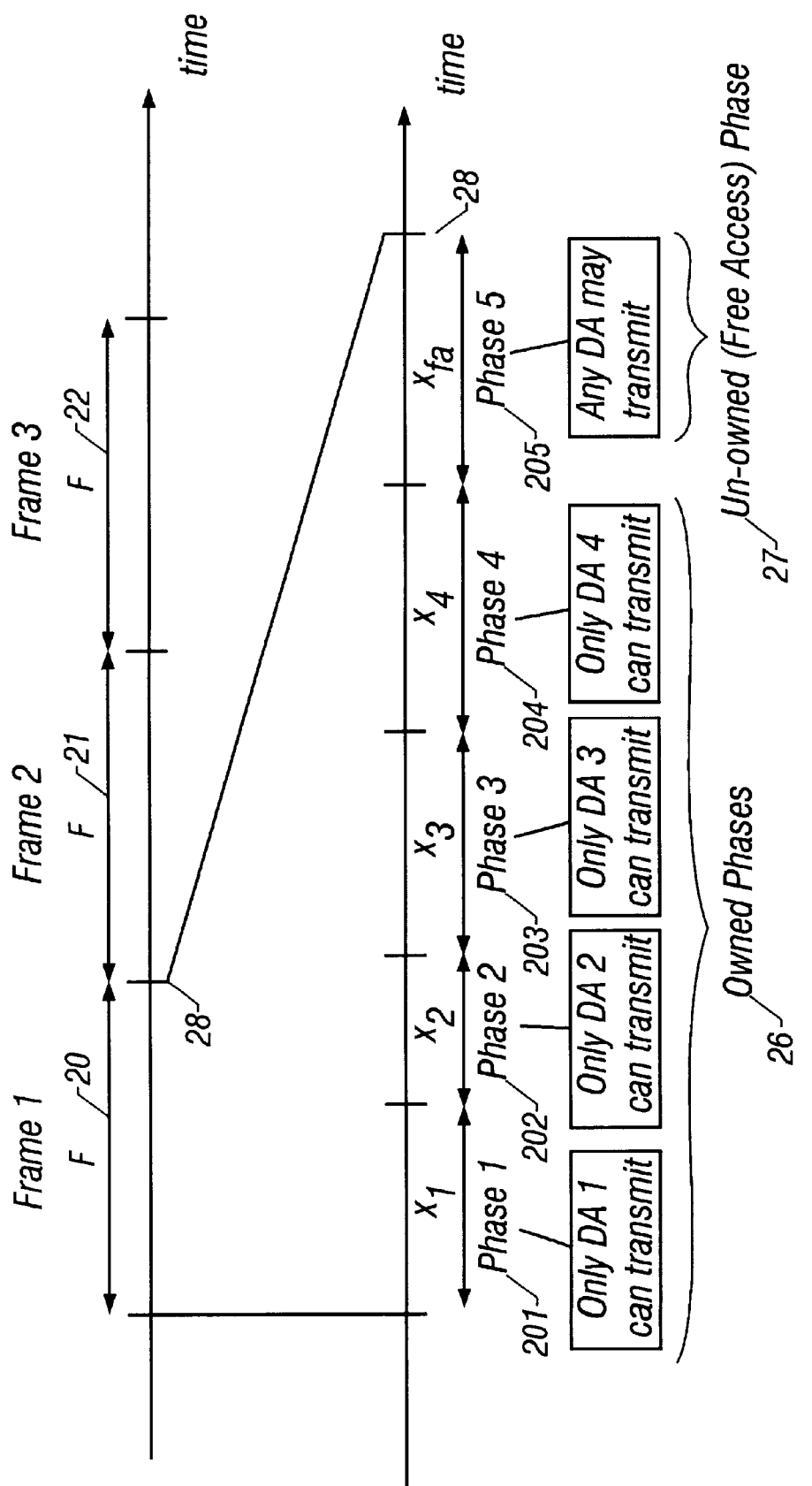
FIG. 4 is a graphical view illustrating the organization of time into repeating frames and time intervals within each frame that define allowable phases for each device to transmit time-sensitive traffic (Conditioned Mode)

As mentioned above, the network of the present invention includes a plurality of device adapters 1000, which plurality is represented by N. The device adapters 1000 may then be respectively indicated by DA1, DA2, DA3, . . . DAN. Referring to FIG. 4, time is divided into equal length frames 20, 21, and 22 of duration F, for example, 25 ms. Only three exemplary frames 20, 21, and 22 are shown; however, the frames repeat at a periodic rate. For purposes of this discussion, an embodiment of the network 110 includes four device adapters, i.e., N=4. Relative to the common time reference, the frame boundaries are at times t=nF, where n is an integer. Each frame 20–22 is divided into N+1 non-overlapping intervals called phases, which phases are labeled p=1, 2, 3, . . . N+1. In the exemplary embodiment shown in FIG. 4, five phases 201, 202, 203, 204, and 205 for the first frame 20 are shown.

The first N phases are phases respectively owned by the device adapters 100 and are generally indicated by numeral 26. That is, if p satisfies $1 \leq p \leq N$, then phase p is owned by or assigned to DAp. A device adapter 1000 is not allowed to transmit packets in any phase except for the phase owned thereby. That is, device adapter DA1 only transmits in phase 1; device adapter DA2 only transmits in phase 2; and so on. Accordingly, collisions are eliminated during owned phases. The network 110 is then said to be operating in Conditioned Mode. If real-time traffic is transmitted only during owned phases, then this arbitration mechanism eliminates collisions for real-time traffic. The device adapters 1000 may store packets awaiting transmission during the assigned phases 26 in the on-board memory 1012. Alternatively, such packets may be stored in the memory of the generating device 100 or 200 itself.

The assignment of phases 201–205 to the device adapters 1000 may be coordinated by the master device in response to requests from the other devices. The master device may be defined as DA1, with each device coming on line subsequently respectively defined as DA2, DA3, and so on. The master device may transmit a frame-start signal at the start of every frame 20, 21, 22, and so on. The number of phases in each frame may be defined or created by the master device in accordance with the number device adapters 1000 that are on line. Accordingly, the number of phases may vary from frame to frame, and the length of each phase may vary within a frame, as well as from frame to frame, in accordance with the volume of packets to be transmitted by a particular device. The master device may broadcast this information to the device adapters 1000 at the start of each frame. Alternatively, the phases may be of equal length with each device adapter 1000 choosing an unassigned phase by transmitting during the phase, thereby having that particular phase now assigned to the particular device adapter.

Each of the frames 20–22 may have a "guard" band or phase at the start of each frame during which no device adapter 1000 is allowed to transmit packets. The guard phase accounts for variations in signal delays and variability in quenching free-access transmissions from the previous frame. The guard phase will be discussed in more detail below.

With reference to FIG. 2, the network 110 of the present invention may include bridges and routers. If included, then the bridges and routers are used in place of or in conjunction with repeaters 3 within the network. The time synchronization of the device adapters 1000 can still function to eliminate congestion at the bridge, thereby preserving deadlines and guaranteeing quality of service for real-time signals.

If the latency of the bridges or routers is small with respect to the duration of a phase, then the traffic conditioning and real-time quality of service guarantees of the present invention will continue to function as described. If the latency of the bridges or routers is substantial with respect to the duration of a phase, it may be desirable to surround the bridge or router with device adapters 1000. Alternatively, the device adapters 1000 of the invention may be physically and logically incorporated within a bridge or router. In this case, the device adapters subdivide the network into multiple conditioned domains for each side of a bridge or router wherein a separate framing structure is used within each domain to continue to guarantee service quality. However, in this latter case, there may be at least an additional frame of delay added to the overall latency for packets crossing a conditioned domain.

With continued reference to FIG. 4, in addition to the owned or assigned phases 26, each frame 20, 21, 22 includes an unassigned, unowned, or free-access phase which is indicated by numeral 27. The free-access phase 27 is defined as phase N+1. The free-access phase 27 is defined as a phase in which any of the device adapters 1000 may transmit packets of data. Although the free-access phase 27 may be at any location within the frame, the free-access phase is shown in the drawings as the last phase of a frame.

Arbitration within the free-access phase 27 may operate in accordance with the CSMA/CD protocol. Therefore, collisions may occur during the free-access phase 27. Each device adapter 1000 transmitting a packet during the free-access phase may do so without crossing a frame boundary 28. Thus, towards the end of the free-access phase, a device adapter 1000 may have to refrain from transmitting a packet to ensure that DA1 can transmit during phase 1 of the following frame.

Each of the phases 1, 2, 3, . . . N has a length of time indicated by $x_1, x_2, \ldots x_N$, respectively. Time $x_{fa}$ is the length of the free-access phase 27. As the length of each frame is preferably constant, as represented by F, then the summation of the lengths of the phases 26 and 27 equals the length of the frame, i.e., $x_1+x_2+ \ldots +x_N+x_{fa}=F$.

Figure 5:
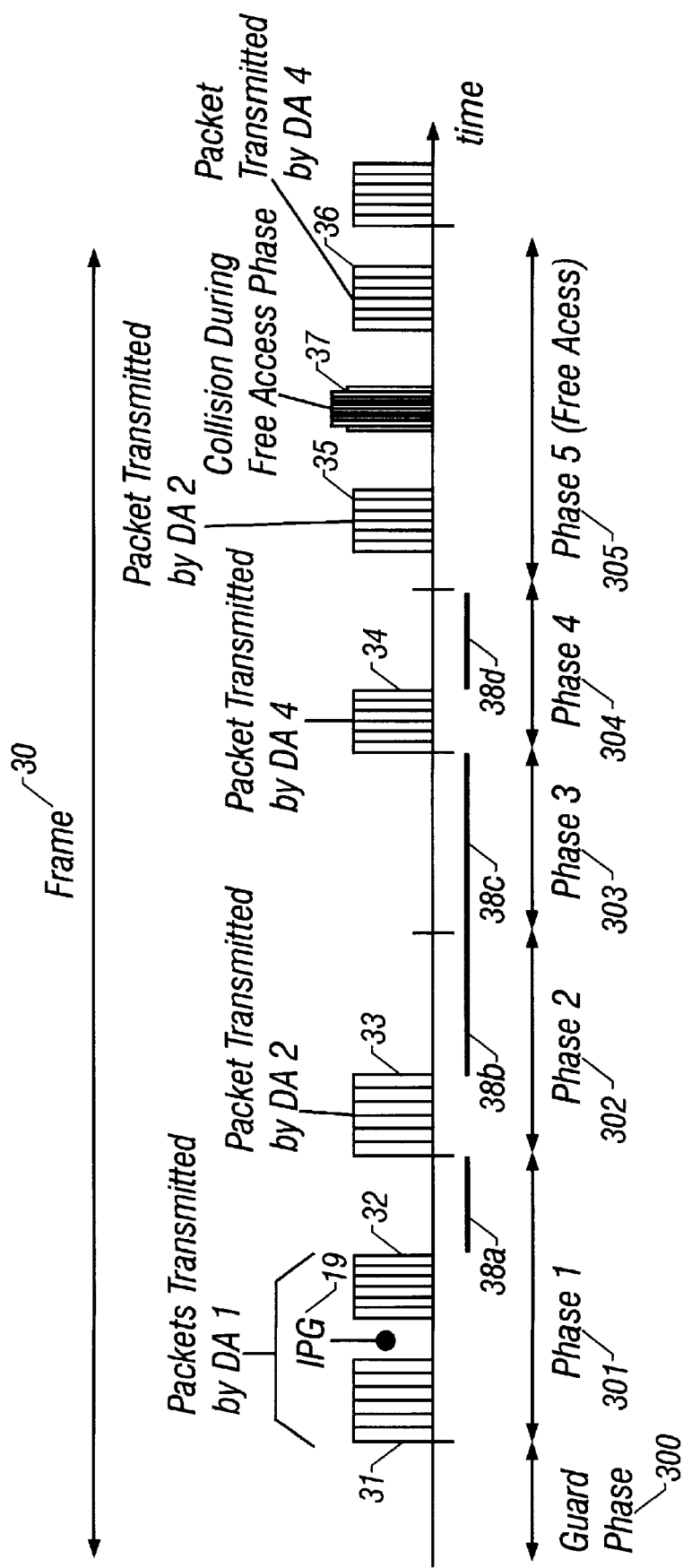
FIG. 5 is a graphical view illustrating an arbitration mechanism in Conditioned Mode of the invention, particularly illustrating the arbitration mechanism in which a duration of each phase is fixed.

A streamlined embodiment of the arbitration mechanism of the present invention is illustrated in FIG. 5. In this embodiment, the lengths of the phases 301–305 are constant across the frames. In describing the embodiment, four device adapters (i.e., N=4) are provided, for example. In each frame 30, DA1 transmits two packets 31 and 32 during a first phase 301 with each packet separated by an inter-packet gap (IPG) 19; DA2 transmits a packet 33 during a second phase 302; DA4 transmits a packet 34 during a fourth phase 304, and two packets 35 and 36 are transmitted during a fifth phase 205 separated by a collision 37. During phase p, DAp can transmit real-time traffic as well as non-real time traffic, where $1 \leq p \leq N$. Although streamlined, this embodiment may at times be somewhat inefficient in that if a device adapter either has nothing to transmit during the phase it owns or does not have enough traffic to fully utilize its owned phase, then idle time indicated by references 38a, 38b, 38c, and 38d during the phase is not utilized, because a device adapter that has packets queued and waiting for transmission can only transmit during a phase that it owns.

As mentioned above, each of the frames 30 may include a guard phase 300 at the start of the frame during which time no device adapter 1000 is allowed to transmit packets. If the device adapters 1000 are not precisely synchronized, then there may be variations in the signal delays of the packets. The guard phase 300 provides a time period in which any such variations in signal delays of the device adapters 1000 are compensated. In addition, the guard phase 300 allows any packets transmitted during the free-access phase 305 from the previous frame, which may not have yet reached their destination, to be delivered. Accordingly, the guard phase 300 is a period of time during which no new packets are transmitted and the network 110 is essentially quiet. In the embodiment including the guard phase 300 at the beginning of each frame, the device adapters 1000 do not need to be precisely synchronized but may operate somewhat out of synch and still guarantee a high quality of service in delivering real-time packets.

Figure 6:
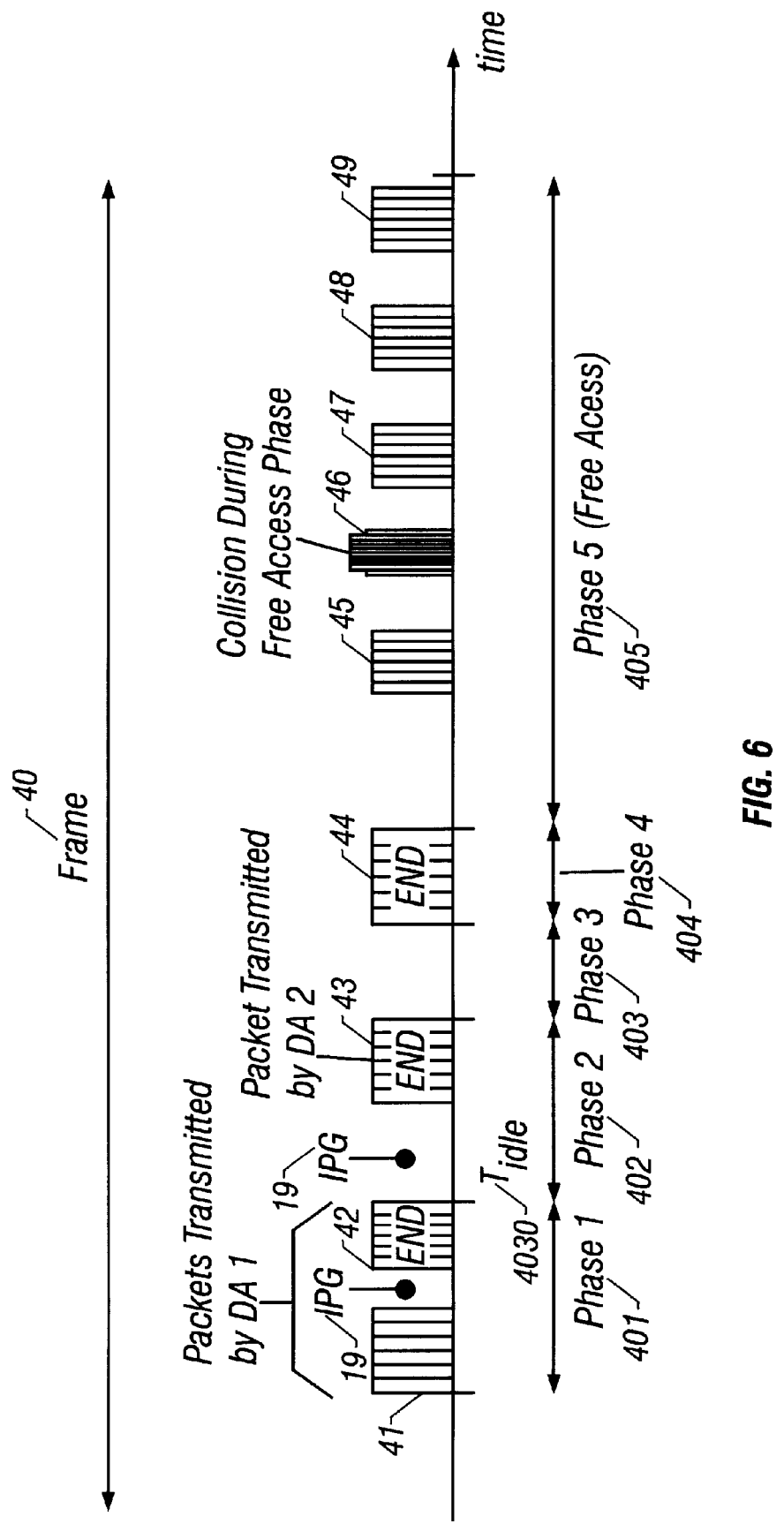
FIG. 6 is a graphical view similar to that of FIG. 5, particularly illustrating the arbitration mechanism in which the duration of each phase can be shortened due to a lack of packets.

A more efficient embodiment of an arbitration mechanism of the present invention is illustrated in FIG. 6. In this embodiment, the durations $x_1, x_2, \ldots x_N$ and $x_{fa}$ of phases 401–404 are dependent on the offered traffic and have the possibility of being different in each frame, thereby providing a mechanism to end owned phases early, so that the Ethernet network can be more efficiently utilized. A set of numbers $y_1, y_2, \ldots y_N$ is specified a priori, where $y_1+y_2+\ldots+y_N<F$. This set of numbers serves as an upper bound to the length of the owned phases. In particular, the duration of phase p is constrained to be no longer than $y_p$, i.e., $x_p \leq y_p$. The duration of the free-access phase is then $x_{fa}=F-(x_1+x_2+\ldots+x_N)$. In this mode of operation, there are two possible mechanisms used by the device adapters 1000 to determine phase boundaries. First, if DAp has at least one packet to transmit during phase p, then a control signal is included the last packet transmitted by DAp during phase p, which control signal is referred herein to as an END signal. The END signal signifies that phase p ends after the transmission of the packet and that the next phase is beginning.

The second mechanism utilized by the device adapters 1000 to determine a phase boundary is used when DAp has no packet to transmit during phase p. In this case, DAp remains idle during phase p, and phase p is defined to end when the network has been idle for a predetermined amount of time $T_{idle}$. For example, $T_{idle}$ may be set to be equal to twice the standard inter-packet gap (IPG). Alternatively, each device adapter may send at least one packet during the phase it owns, which may be a dummy packet containing only the END signal.

With continued reference to FIG. 6, an example of the possible timing of events within a frame is depicted. Consistent with the foregoing example, it is assumed that the network includes four device adapters (i.e., N=4). Within illustrated frame 40, DA1 transmits two packets 41 and 42 during a first phase 401 separated by inter-packet gap 19. A last packet 42 transmitted by DA1 during the first phase 401 contains the END signal, signifying the end of the first phase 401. During a second phase 402, DA2 has only one packet 43 to transmit; DA2 therefore includes the END signal within the packet to indicate the end of the second phase 402. DA3 does not have packets to transmit during its respective phase 403; accordingly, DA3 remains silent. By definition, the third phase 403 ends after $T_{idle}$ seconds of silence, which is indicated by 4030. During a fourth phase 404, DA4 has only one packet 44 to transmit; therefore, DA4 places the END signal within the packet to indicate the end of the fourth phase 404. During the fifth or free-access phase 405, four packets 45, 47, 48, and 49 are successfully transmitted, and one collision 46 occurs.

Another possible embodiment for an arbitration mechanism of the present invention is to eliminate the free-access phase 405, i.e., $x_{fa}=0$, and to dynamically allocate the durations of the owned phases through a token passing mechanism, as in some token ring protocols such as FDDI.

Annex Mode

Figure 7:
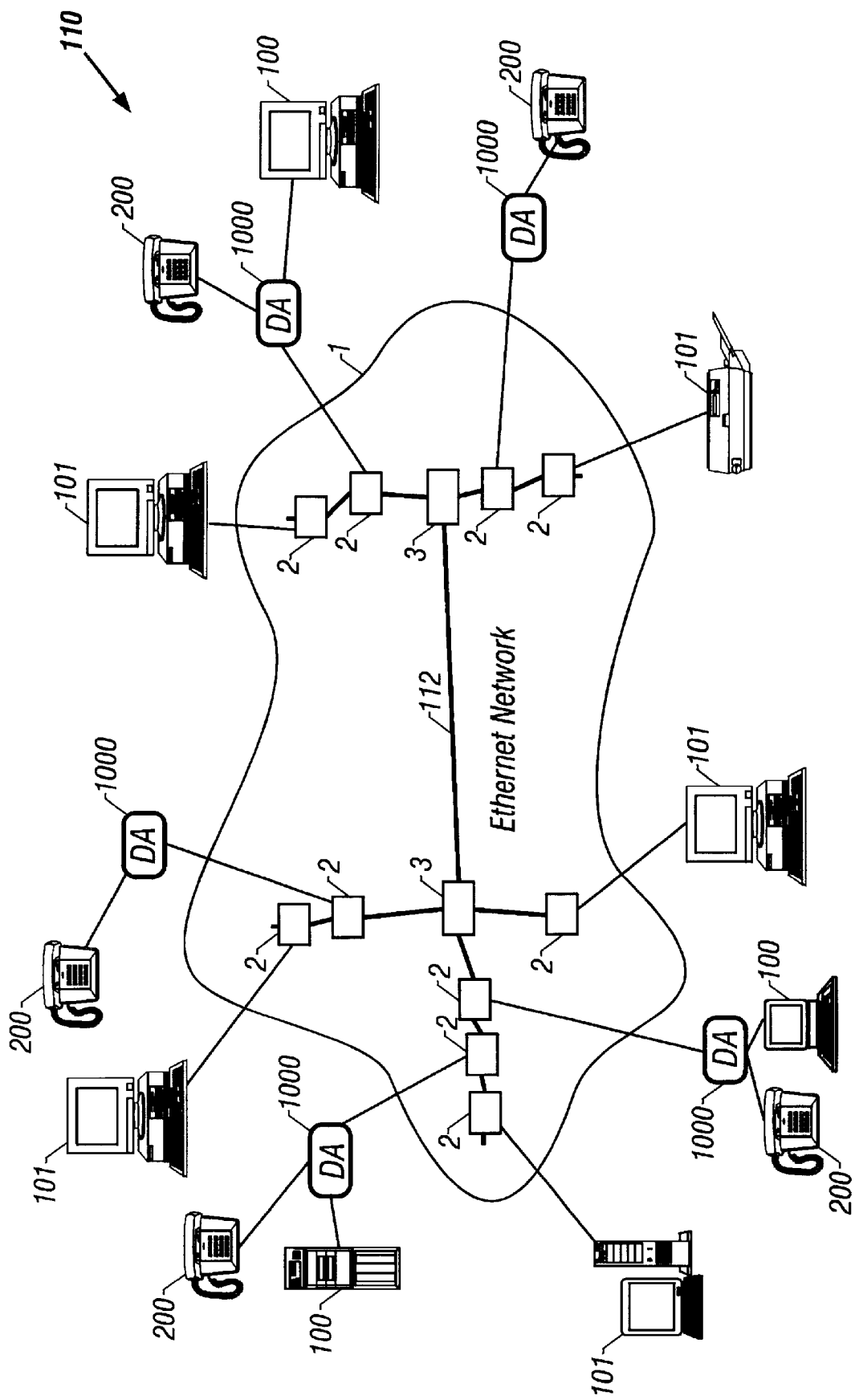
FIG. 7 is a schematic view of an exemplary Ethernet network in accordance with the present invention, particularly illustrating an Annex Mode of the network, in which real-time devices and conventional Ethernet devices are attached to the Ethernet network.

As mentioned above, in addition to Condition Mode, the network of the present invention operates in Annex Mode. With reference to FIG. 7, the network operates in Annex Mode when the device adapters 1000 of the invention coexist with non-real-time devices (NRTDs) that are attached directly to the network medium 112 via network interface points 2, which devices are known as native NRTDs. As discussed in more detail below, in Annex Mode, when there is a surplus of time to meet deadlines, the transmission of real-time packets may be delayed in deference to non-real-time packets. However, collisions may be forced for non-real-time packets when a scheduled real-time packet may otherwise miss a deadline.

For example, a device adapter 1000 may determine whether there is sufficient time to transmit and deliver a real-time packet by a deadline. If so, the device adapter may defer transmission of the packet to allow a native NRTD to transmit non-real-time packets. If not, then the device adapter may become aggressive in attempting to meet a deadline. The device adapter may transmit the packet to force a collision with the native NRTD. Or it may ignore the normal 802.3 back-off algorithm and immediately retransmit after a collision without waiting. Alternatively, the device adapter may retransmit before waiting the full interpacket gap time to usurp media access; that is, the device adapter may reduce the interpacket gap and then immediately retransmit the packet. Any combination of these techniques serve to increase the priority of a device of this invention with respect to a native NRTD to guarantee timely delivery of a real-time packet transmitted by a device adapter in contention with one or more native NRTDs.

Exemplary network 110 may include a plurality of NRTDs 101 connected directly to the Ethernet network 1 through network interface points 2. Real-time devices (RTDs) 200 may be attached to device adapters 1000, which in turn are connected to network interface points 2. The Annex Mode of operation of the network 110 is advantageous, as to support a conventional NRTD it is not necessary to connect the NRTD to a device adapter 1000, which means that a conventional Ethernet network can be upgraded incrementally as additional real-time devices are installed. As illustrated in FIG. 7, NRTDs 100 are preferably attached to device adapters 1000 as the device adapters 1000 may condition the traffic generated by NRTDs 100 to reduce collisions. An NRTD that is directly attached to a device adapter 1000 is considered a conditioned NRTD 100, and an NRTD that is directly attached to the conventional Ethernet network is a native NRTD 101.

A central issue with Annex Mode of the network is that the native NRTDs 101 may use a standard carrier sense multiple access collision detect (CSMA/CD) protocol and, hence, are not aware of any timing and packet-pacing mechanism used by the device adapter. The device adapters 1000 may support latency and throughput guarantees for real-time traffic by modifying the back-off protocol to ensure that packets from real-time traffic are delivered in a timely manner, which will be discussed in more detail below. However, as noted above, if a packet from a native NRTD 101 experiences several collisions, the latency suffered by the packet significantly increases as the average delay grows exponentially with the number of collisions.

An arbitration mechanism of the present invention supports significant traffic load from RTDs 200 without causing a significant increase in the average delay seen by native NRTDs 101, provided that the traffic load offered by the native NRTDs 101 is sufficiently low. It is preferable for native NRTDs 101 to back off after collisions only when necessary to meet deadlines of time-sensitive signals, or when congestion caused by other native RTDs 101 is present. As a native NRTD 101 does not know when real-time traffic is being transmitted, this is not possible. Instead, the operation of the device adapters 1000 in Annex Mode prevents unnecessary collisions between device adapters 1000 and native NRTDs 101. The device adapters 1000 accomplish this goal by deferring to native NRTD 101 traffic when possible.

Figure 8:
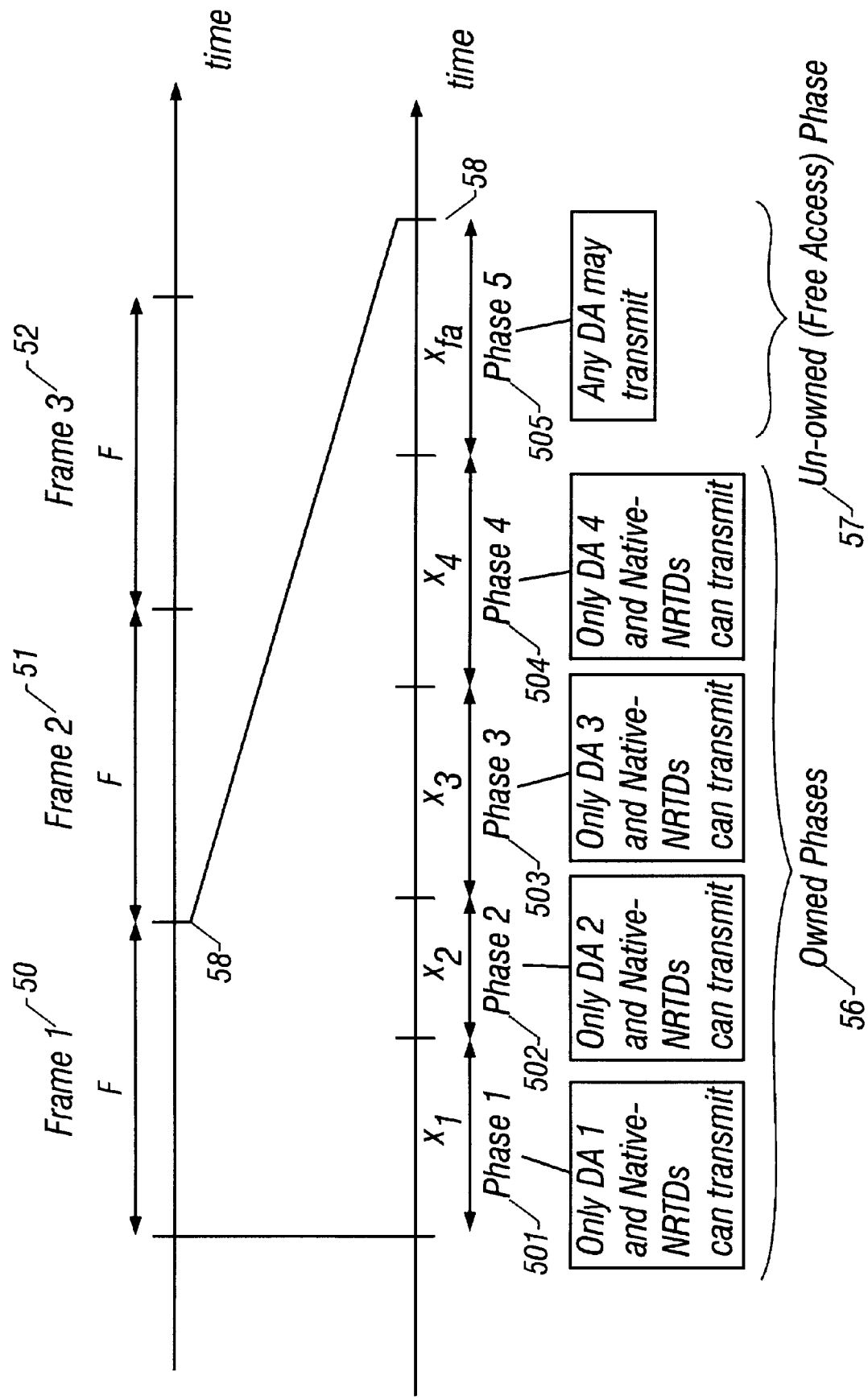
FIG. 8 is a graphical view illustrating the organization of time into repeating frames and time intervals within each frame that define allowable phases for each device to transmit time-sensitive traffic (Annex Mode)

The arbitration mechanism of the device adapters under Annex Mode will now be described with reference to FIG. 8. As mentioned above, a common time reference is obtained by the device adapters. Time is divided into equal length frames of duration F, and frame boundaries occur at times t=nF relative to the common time reference, where n is an integer. Continuing the exemplary number of device adapters for this description, it is assumed that there are four device adapters 1000 (i.e., N=4). Each frame is divided into N+1 non-overlapping intervals or phases, which are labeled p=1, 2, 3, ... N+1. Three frames 50, 51, and 52 are shown, and five phases 501, 502, 503, 504, and 505 for frame 50 are shown. The first N phases are owned by respective device adapters 1000, as indicated by numeral 56. That is, if p satisfies $1 \leq p \leq N$, then phase p is owned by DAp. A device adapter is not allowed to transmit in any owned phase except for the phase that its own. However, as native NRTDs 101 are oblivious to the framing structure, it is possible that native NRTDs 101 will attempt to transmit a packet at any time during a frame.

Analogous to the discussion above, phase N+1 is unowned, as indicated by numeral 57, is considered as a free-access phase, allowing any device adapter 1000 to transmit during this last phase of a frame. CSMA/CD protocol may be used during the free-access phase 57, and, therefore, collisions may occur during the free-access phase 57. Each device adapter 1000 transmitting a packet during the free-access phase 57 does so without crossing the frame boundary 58. Thus, towards the end of the free-access phase 57, a device adapter 1000 may have to refrain from transmitting a packet. Note that as native NRTDs 101 can transmit a packet at any time, a packet transmission from a native NRTD 101 may cross a frame boundary 58.

The length of the phases 501–505 may vary in each frame 50–52 according to an exemplary arbitration mechanism of the present invention. In the arbitration mechanism, there are N numbers $Y_1, Y_2, \ldots Y_N$ such that $0 < Y_1 < Y_2 < \ldots < Y_n \leq F$. The interpretation of these numbers, which may be assigned a priori, is that if a frame begins at time t, then phase p of that frame must end by time $t+Y_p$. Letting $x_1, x_2, \ldots x_N$ denote the lengths of phases 1, 2, 3, ... N, in this frame, respectively, then $x_1+x_2+ \ldots +x_p \leq Y_p$ for all p satisfying $1 \leq p \leq N$. As discussed above before, as the length of each frame is the constant F, the length of the free-access phase is $x_{fa}=F-(x_1+x_2+ \ldots +x_N)$.

As in the operation of Conditioned Mode illustrated in FIG. 6, the durations of each phase may be shortened when a device adapter 1000 does not have enough traffic to fully utilize the phase it owns. For example, when DAp has enough traffic, DAp may prolong the duration of phase p until time $t+Y_p$. Note that DA1 may have the opportunity to prolong the duration of phase 1 to a length of $Y_1$ seconds, if it has enough traffic. Also, since phase p ends before time $t+Y_p$, DA(p+1) has the opportunity to prolong the duration of phase p+1 to at least $Y_{p+1}-Y_p$ seconds if it has enough traffic, where $1 \leq p < N$. This arbitration mechanism provides throughput and latency guarantees to real-time traffic.

Figure 9A:
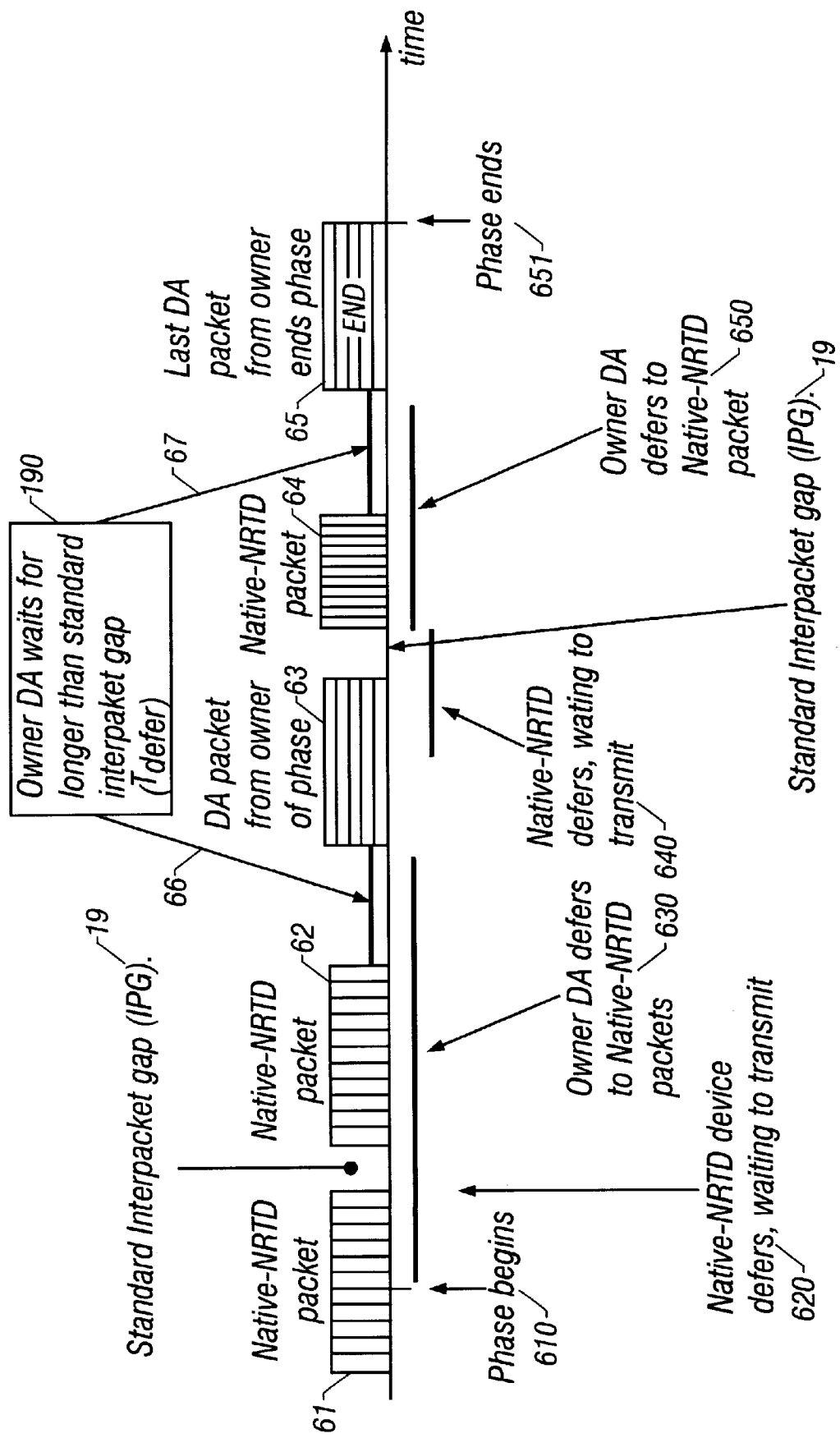
FIGS. 9a, 9b, and 9c are graphical views illustrating respective exemplary arbitration mechanisms of the present invention in Annex Mode.
Figure 9B:
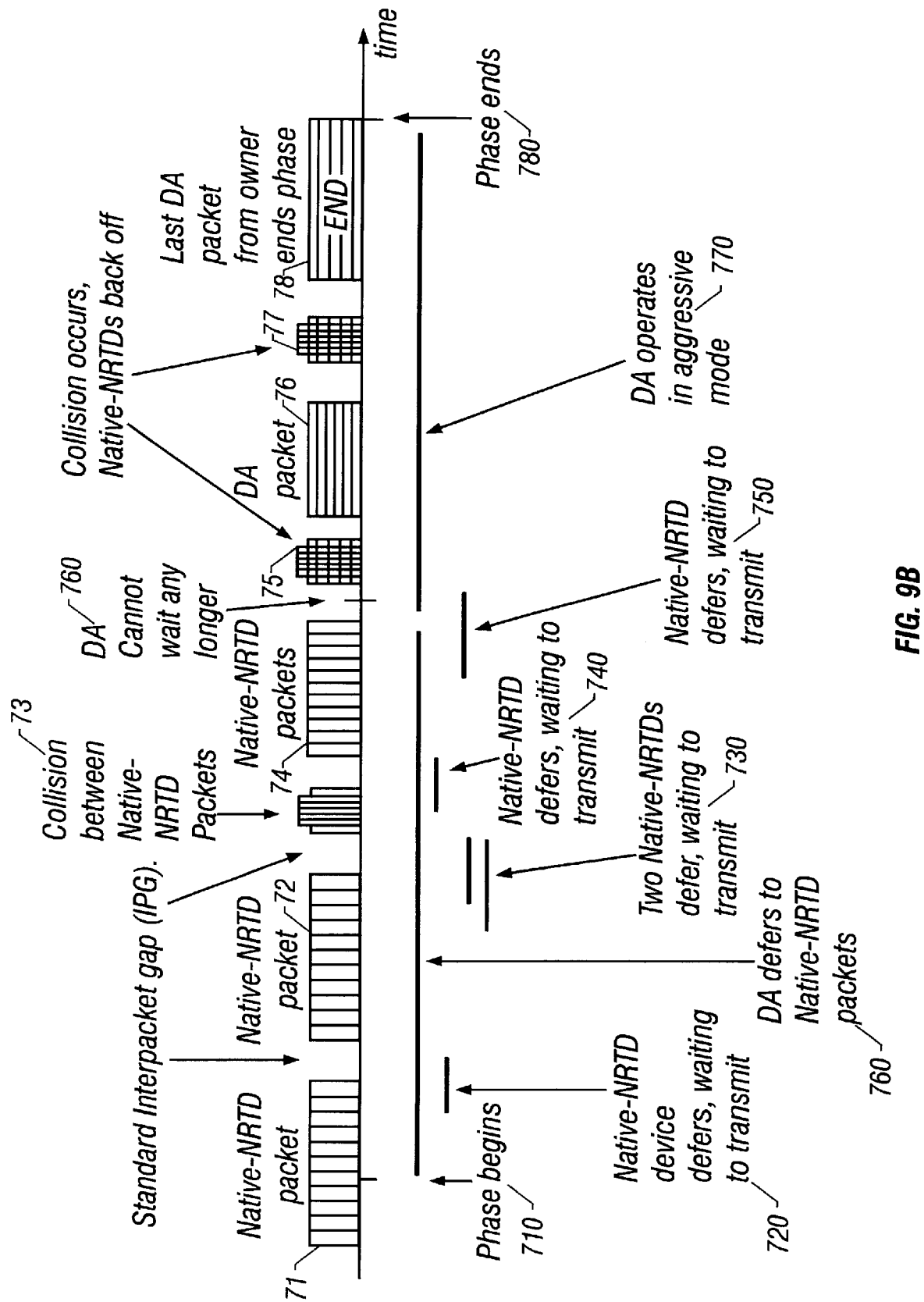
Figure 9C:
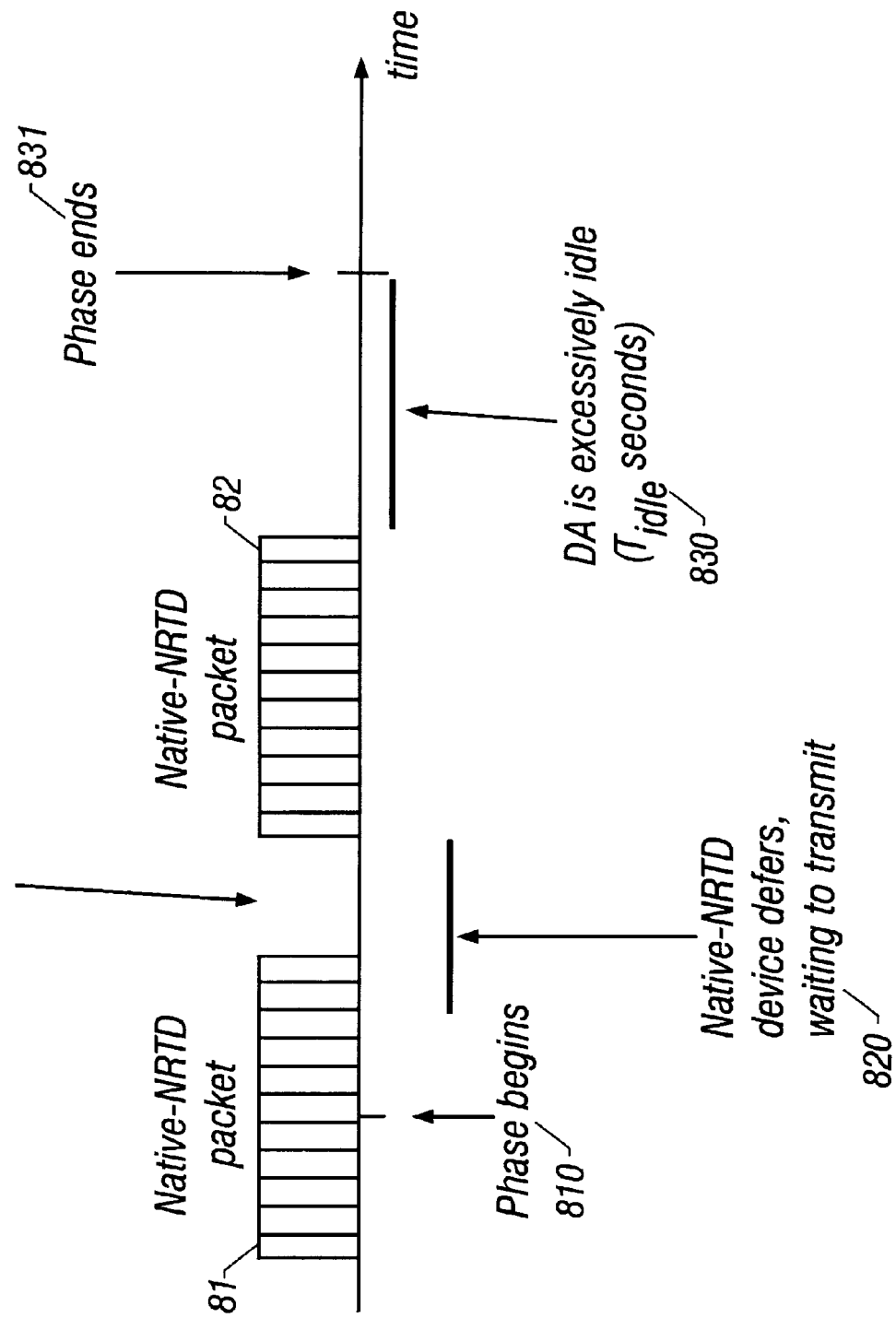

Exemplary arbitration mechanism utilized by the device adapters 1000 in Annex Mode are illustrated in FIG. 9a, FIG. 9b, and FIG. 9c. As mentioned above, a device adapter 1000 may only transmit packets during the phase it owns or during a free-access phase. Thus, during phase p, the only devices that may transmit a packet are native NRTDs 101 and DAp . Also mentioned above, native NRTDs 101 may use a CSMA/CD protocol. A native NRTD 101 that is deferring transmission of a packet will typically wait only IPG 19 seconds after sensing the network is idle before transmitting a packet, because if it were to wait longer, it would be at a disadvantage relative to other devices implementing the CSMA/CD protocol. As collisions are most likely to occur after the network becomes idle, a device adapter 1000 can avoid a collision with a native NRTD 101 by waiting for a time longer than the IPG 19, namely, a defer time $T_{defer}$ 190 after sensing the network becomes idle before starting to transmit a packet. This gives native NRTDs the first opportunity to use the network when the state of the network becomes idle, as shown illustrated FIG. 9a as the possible timing of events during an owned phase.

In this example, the transmission interval of a packet 61 transmitted by a native NRTD 101 crosses the boundary 610 that defines the beginning of the phase. The DA 1000 which owns the phase has a packet 63 ready to transmit at the beginning of the phase 610, but defers (as indicated by numeral 630) to two packet transmissions 61 and 62 from native NRTDs 101 by waiting until it senses that the network is idle for a duration of at least $T_{defer}$ seconds. More specifically, a native NRTD 101 may attempt to transmit a packet 62 during the transmission of packet 61, but as native NRTDs follow the CSMA/CD protocol and the network is sensed busy, the native NRTD defers (as indicated by numeral 620) the transmission until the channel is sensed idle for at least one IPG 19.

As the value of an inter-packet gap (IPD) 19 is less than $T_{defer}$, a native NRTD is able to begin the transmission of its packet 62 before the owner of the phase. In this example, the owner of the phase is first able to transmit packet 63 after $T_{defer}$ seconds (indicated by numeral 66) following the end of the transmission of packet 62. In this example, after the owner of the phase transmits packet 63 , the phase owner has another packet 65 ready to transmit. Similar to above, another native NRTD 101 transmits packet 64 after deferring (indicated by numeral 640) to packet 63 by waiting for at least IPG 19 seconds of idleness. Packet 65 is not transmitted until $T_{defer}$ seconds (indicated by numeral 67) after the end of the transmission of packet 64. If the owner of the phase does not wish to transmit more packets during the phase, the phase owner may place an END signal within packet 65, signifying that the phase ends (indicated by numeral 651) after transmission of the packet.

When a real-time packet needs to be transmitted in order to meet a deadline, a device adapter 1000 may operate in a "aggressive mode," w hereby the device adapter waits for an inter-packet gap after sensing the network becomes idle before transmitting a packet. In addition, if a device adapter is involved in a collision while in the aggressive mode, the device adapter will not back off after the collision. As native NRTDs 101 are required to back off after collisions according to conventional CSMA/CD protocol, a device adapter 100 of the present invention operating in the aggressive mode can effectively monopolize the network, transmitting real-time traffic as necessary to meet deadlines. A device adapter 1000 will preferably operate in the aggressive mode only if the device adapter would otherwise be in danger of delivering real-time traffic later than required. In addition, the sooner that phase p ends, the less chance that DA(p+1) will need to operate in the aggressive mode. In view of the foregoing, a device adapter 1000 attempts to minimize the chances of collision with native NRTDs 101 during the phase it owns. But when a particular device adapter is otherwise in danger of transmitting packets later than their deadlines, the device adapter may enter the aggressive mode.

An alternative approach for a device adapter operating in aggressive mode is to intentionally cause collisions with native NRTDs 101 without waiting for packet transmissions to end. FIG. 9b illustrates such an example of the aggressive mode, illustrating a possible sequence of events during an owned phase. The first portion of the phase operates in a similar manner to that depicted in FIG. 9a in that the transmission of a packet 61 from a native NRTD 101 overlaps with the boundary 610 that defines the beginning of the owned phase. Referring to FIG. 9b, at the beginning of the phase, the device adapter 1000 which owns the phase has two packets 76 and 78 to transmit during the phase. However, as the phase owner is initially not in aggressive mode, the owner waits until at least $T_{defer}$ seconds of idleness are sensed on the network before beginning the transmission of a packet. Thus, a packet 72 from a native NRTD 101 is able to transmit a packet 72 after deferring (indicated by numeral 720) to packet 71, and a packet 74 from a Native NRTD 101 is transmitted after deferring (indicated by numeral 740) in the midst of a collision 73 that occurs between native NRTDs 101 after the transmission of packet 72, due to simultaneous deference (indicated by numeral 730).

After transmission of packet 74, the owner of the phase determines that it cannot wait any longer 760 to transmit packets 76 and 78, and, therefore, enters the aggressive mode (indicated by numeral 7678). In this example, a native NRTD 101 defers (indicated by numeral 750) a transmission until IPG seconds after packet 74. As the owner has entered aggressive mode at this time, the owner also has the right to transmit IPG seconds after packet 74 ends transmission; thus, a collision 75 occurs. After this collision, the native NRTD 101 backs off while the owner does not back off. Therefore, the owner is able to transmit packet 76 immediately after the collision. After the transmission of packet 76 by the owner, the owner attempts to transmit packet 78, but a collision 77 occurs with a native NRTD 101 which was deferring to packet 76. The owner does not back off after this collision 77 and is able to successfully transmit packet 78 immediately after the collision. As packet 78 was the last packet the owner needed to transmit during the phase, the phase owner places an END signal within packet 78, signifying that the phase ends 780 after transmission of the packet.

As the durations of the phases are variable, it is preferable for the device adapters to be able to determine the boundaries of the phases. As in the Conditioned Mode, there are two possible mechanisms to accomplish this. First, if DAp has at least one packet to transmit during phase p, then DAp includes the END signal in the last packet transmitted during phase p to signify that phase p ends after the transmission of the packet and, hence, the next phase is beginning. This is illustrated by the last packet transmissions 65 and 78 in FIG. 9a and FIG. 9b, respectively.

Another mechanism that device adapters may use to determine a phase boundary is used when DAp has no packet to transmit during phase p. In this case, DAp simply remains idle during phase p, and phase p is defined to end when the network has been idle for a predetermined idle time $T_{idle}$. This is illustrated in FIG. 9c. Alternatively, each device adapter may send at least one packet during the phase it owns, which may be a dummy packet containing only the END signal.

Preferred Embodiment for Transmission Processing

Figure 10A:
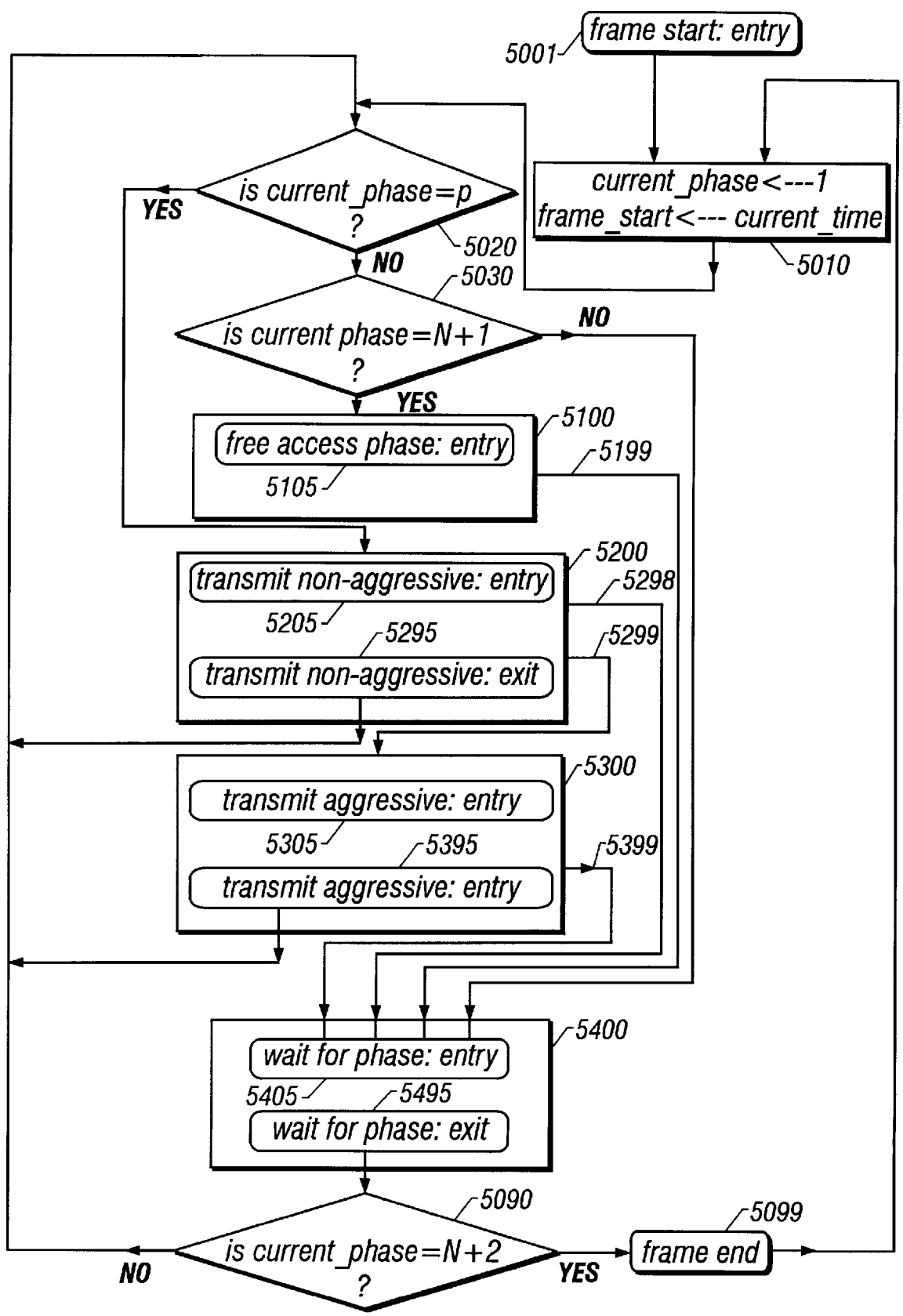
FIGS. 10a, 10b, 10c, 10d, 10e, and 10f are flowcharts illustrating respective exemplary embodiments for packet transmission procedures for a Device Adapter of the present invention, covering both Conditioned Mode and Annex Mode.

A preferred embodiment for managing packet transmissions by a particular device adapter 1000 is described hierarchically in the flowcharts illustrated in FIG. 10a–10f. It is assumed that there are a total of N device adapters 1000 in the network, and each device adapter 1000 is assigned a unique integer address q in the range $1 \leq q \leq N$. It is also assumed that each device adapter has an address p. The overall processing flow for a device adapter is illustrated in FIG. 10a. Those skilled in the art will understand that the flowcharts of FIGS. 10a–10f are for illustrated purposes and that there are multiples of functionally equivalent hardware and software implementations thereof.

The processing disclosed in FIGS. 10a–10f handles both the Annex and Conditioned modes of the invention. Description of the network operating under Annex mode will be provided initially. As discussed in more detail below, the network operating under Conditioned mode can be achieved by modification of a single parameter.

A frame begins at time t=nF, relative to the common time reference in the local network, where F is the frame length and n is an integer. A variable current_time is defined to hold the estimate of the common time reference of the device adapters. Thus, current_time increases at the rate of real time, and the value of current_time across different device adapters 1000 is synchronized to within a small error. For purposes of this description, timing errors are ignored in FIGS. 10a–10f, with modifications to accommodate timing errors later being discussed below. As mentioned above, if a frame starts at time t, then phase q within that frame must end by time $t+Y_q$, and that phase N+1 (i.e., the free-access phase) ends at time $t+Y_{N+1}$ so that the length of each frame is $F=Y_{N+1}$.

Transmission Processing Overview

Referring to FIG. 10a, at the beginning of a frame 5001 the processing moves to block 5010, wherein a counter named current_phase is initialized to 1, and a variable named frame_start is loaded with the value current_time. The value of frame_start thus holds the time at which the current frame began. The value of current_phase represents the index of the phase within a frame and is incremented accordingly as the various phases within a frame progress. From block 5010, the processing moves to decision block 5020.

Within decision block 5020, the value of current_phase is compared to the device adapter address p. If the quantities are not equal, the processing moves to decision block 5030, where the value of current_phase is compared to N+1. In this case, if the current_phase is not equal to N+1, then this indicates that the system is in an owned phase owned by another device adapter. Accordingly, in this case, the processing proceeds to the entry point 5405 of processing block 5400. The basic function of block 5400 is to silently wait for the end of the current phase. When the end of the current phase is reached, current_phase is incremented by 1 within the block 5400, and the exit point 5495 is reached. The details of processing block 5400 will be described in more detail below.

Referring back to decision block 5030, if current_phase=N+1, then this indicates that the system is in the free-access phase, and the processing accordingly moves to the entry point 5105 of processing block 5100. The function of processing block 5100, which will be described in detail later, is to manage packet transmissions according to standard Ethernet CSMA/CD protocol while inhibiting transmissions at the end of the free-access phase, at which time the processing leaves block 5100 through transition 5199 to the entry point 5405 of the processing block 5400. In this case, within block 5400, the device adapter waits for the free-access phase to end, increments current_phase, and exits at point 5495.

Referring back to decision block 5020, if current_phase= p, then this indicates that the beginning of phase p, which is owned by the device adapter, has started. Accordingly, the processing moves to the entry point 5205 of processing block 5200. The function of the processing block 5100, which is also described in more detail below, is to transmit packets during the phase owned by the device adapter. The transmissions within block 5100 will be done in a non-aggressive mode, deferring to native device adapters by using a longer inter-packet gap. If the device adapter is able to transmit the required number of real-time packets before the time that phase p is required to end, namely, at time t+$Y_p$, then the device adapter signals the end of the phase to the other device adapter through an END signal contained within the last packet sent, increments current_phase by 1, and leaves the processing block 5200 through the normal exit point 5295.

If the device adapter has no packets to transmit during phase p, the processing moves through transition 5298 to the entry point 5405 of processing block 5400. In this case, within block 5400 the device adapter remains silent which signals the end of phase p, increments current_phase, and exits at point 5495.

If, during the course of phase p, the device adapter would otherwise be in danger of not being able to transmit real-time packets before their deadlines, the processing moves through transition 5299 to the entry point 5305 of processing block 5300. The function of processing block 5300 is to transmit packets during the phase owned by the device adapter operating in the aggressive mode. When the required number of real-time packets have been transmitted during phase p, the device adapter signals the end of the phase to the other device adapters through an END signal contained within the last packet sent, increments current_phase by 1, and leaves the processing block 5300 through the normal exit point 5395.

Under nominal operating conditions, a particular device adapter will be able to send all the required packets during phase p. However, as a safety measure, the processing may move through transition 5399 to the entry point 5405 of processing block 5400. In this case, the processing within block terminates phase p at the required time and current_phase is incremented by 1 before moving to the exit point 5495 of processing block 5400.

After the termination of a phase, at exit points 5295 or 5395, the processing moves to the decision block 5020 again, so that the next phase within the frame can be processed. After termination of a phase at point 5395, the processing moves to decision block 5090. Within decision block 5090, the value of current_phase is compared to N+2. If current_phase=N+2, this indicates the end of a free-access phase, which is the last phase of a frame. The reason that current_phase=N+2 in this case is that current_phase is incremented from its value of N+1 within processing block 5400. Accordingly, if current_phase=N+2 within block 5090, then the processing moves through point 5099, indicating the end of a frame, to point 5010 where current_phase is reinitialized to 1 and the frame processing repeats for the next frame. If current_phase is not equal to N+1 within decision block 5090, then the processing moves to decision block 5020 so that the next phase within the current frame can be processed.

Block 5400: Waiting for Phase to End

Figure 10B:
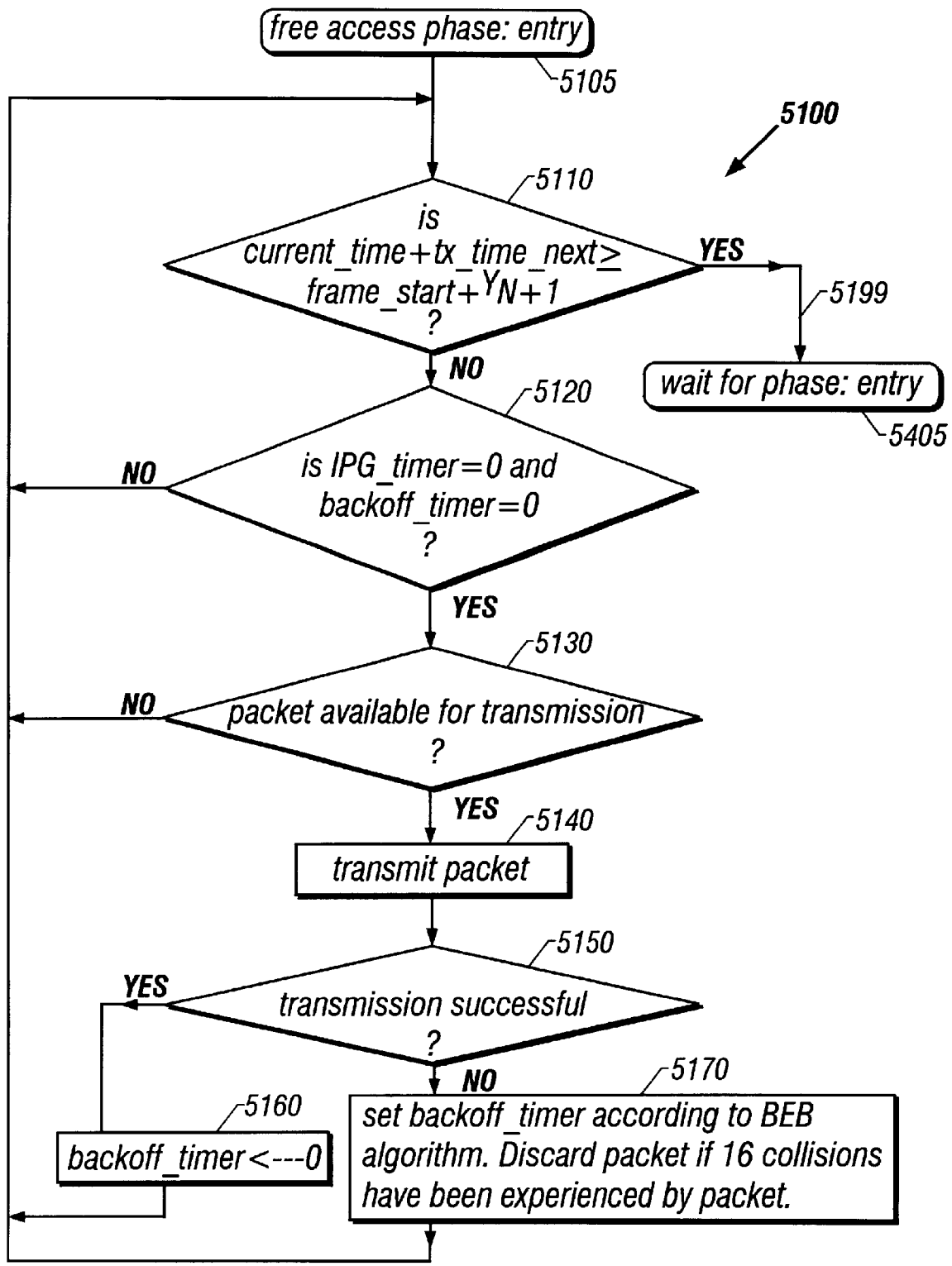
Figure 10C:
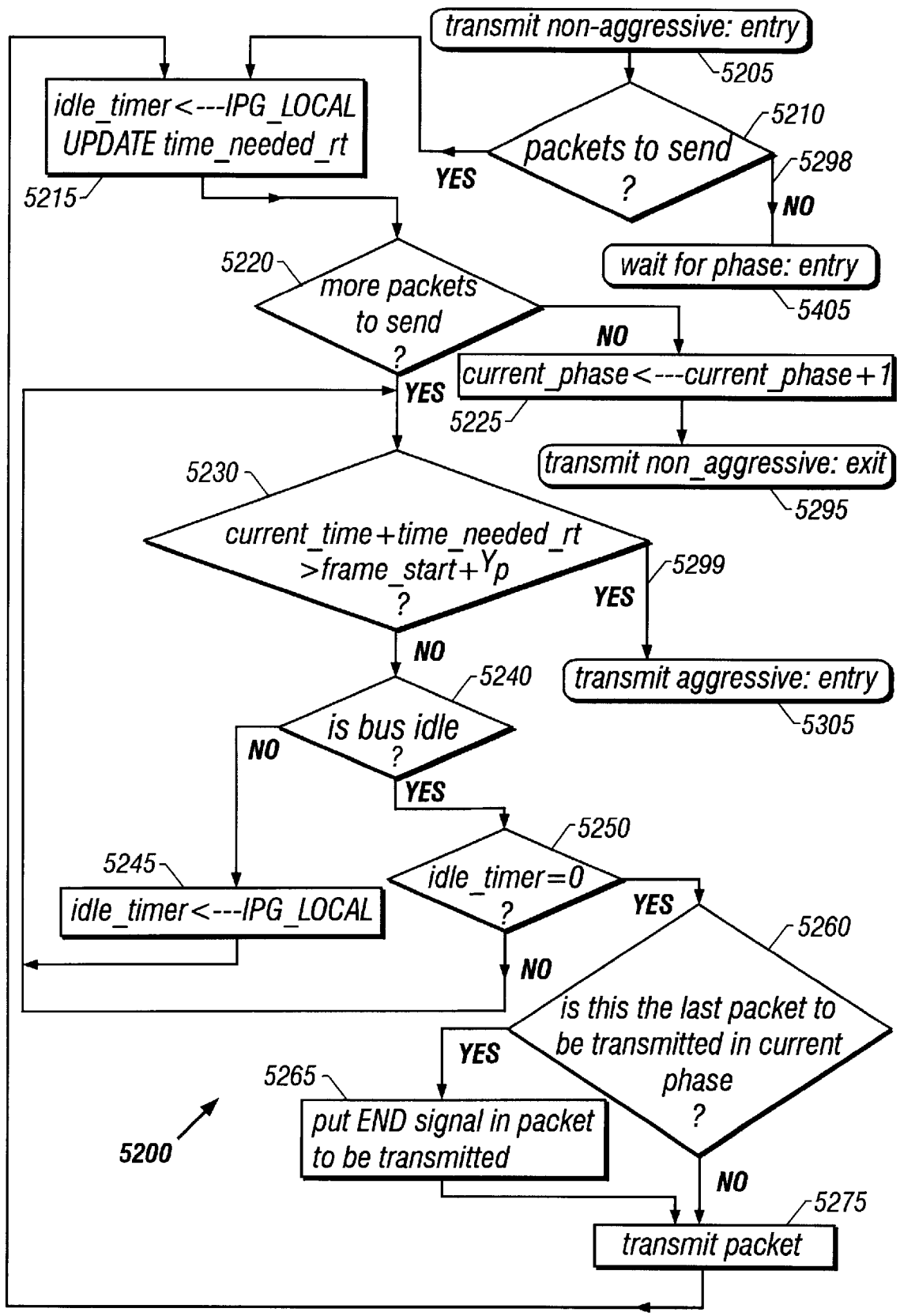
Figure 10D:
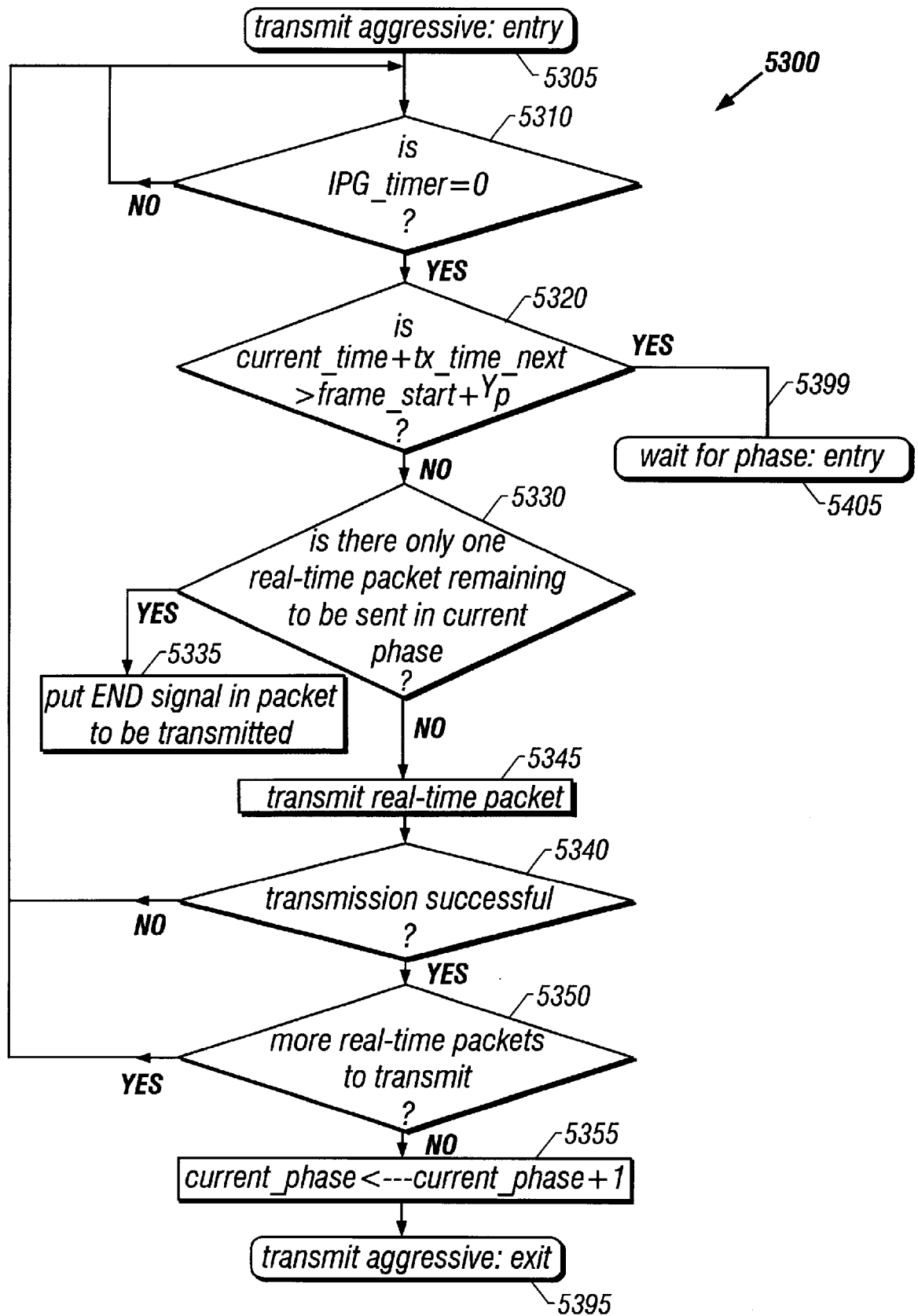
Figure 10E:
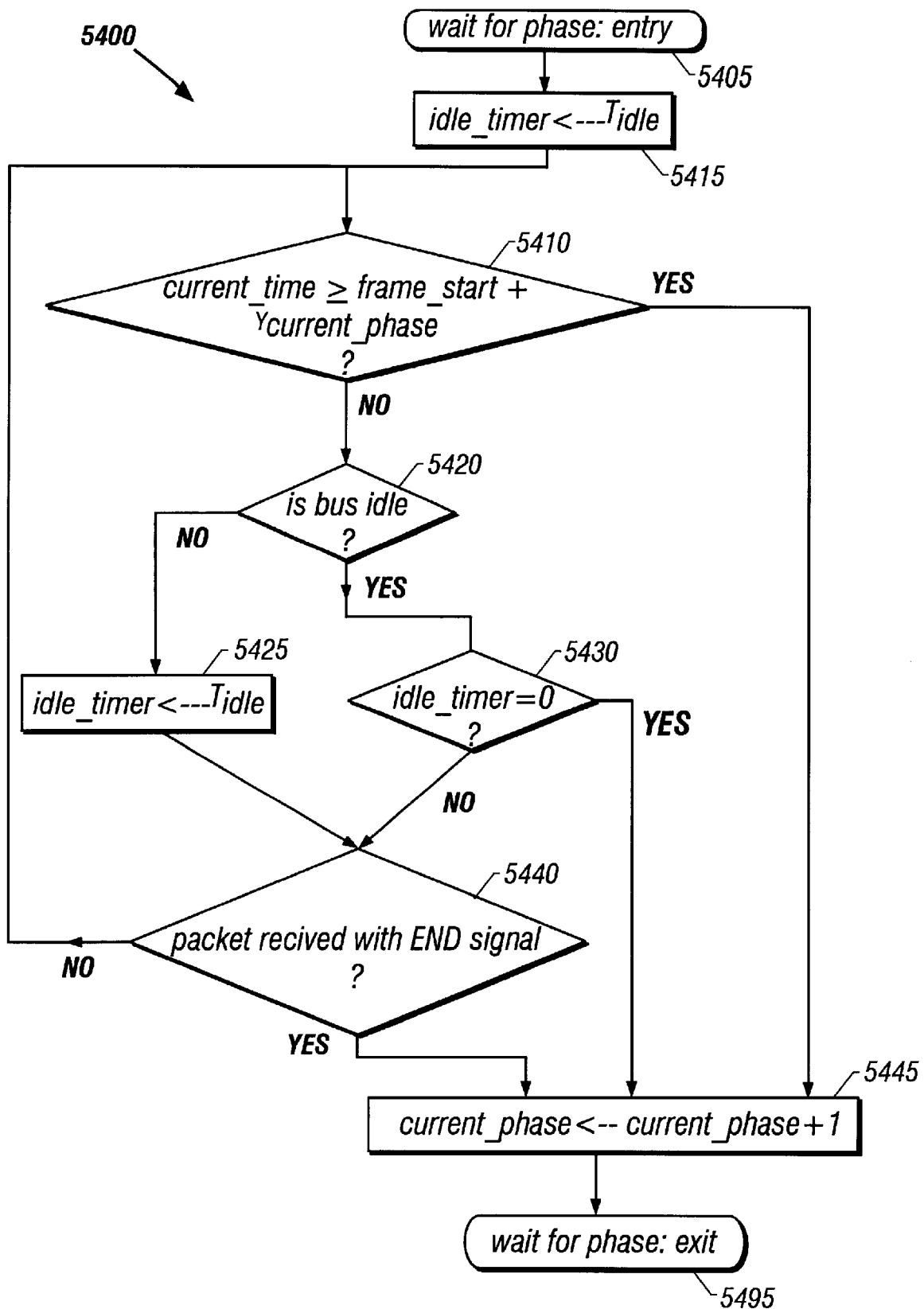

Turning to the description of processing block 5400, reference is made to FIG. 10e. As mentioned above, the function of block 5400 is to determine when the end of the current phase occurs, and increment current_phase by 1 when the phase transition occurs. From the entry point of the block 5405, the timer idle_timer is set to the parameter $T_{idle}$, as indicated by block 5415. Once set to a positive value, the value of idle_timer decrements at the rate of real time until it reaches zero, at which time the value of idle_timer retains the value zero until reset again. After setting idle_timer to $T_{idle}$, the processing moves to decision block 5410 wherein the value of current_time is compared to the sum of frame_start and $Y_{current\_phase}$. As mentioned above, by definition if a frame starts at time t, then phase q within that frame must end by time t+$Y_q$. The purpose of the decision block 5410 is therefore to ascertain whether or not the current phase should be terminated on this basis. Accordingly, if current_time is greater than or equal to the sum of frame_start and $Y_{currrent\_phase}$, then the current phase terminates and the processing moves from 5410 to 5445, where the variable current_phase is incremented by 1. If current_time is less than the sum of frame_start and $Y_{current\_phase}$, then the phase continues until the time that the bus remains idle for $T_{idle}$ seconds, or the time at which a packet is received with an END signal, or until time frame_start+$Y_{current\_phase}$, whichever is earliest. Accordingly, the processing will follow a loop through blocks 5410, 5420, 5425 or 5430, and 5440, until such time the processing moves to block 5445.

More specifically, if current_time is less than the sum of frame_start and $Y_{current\_phase}$, the processing moves to decision block 5420, wherein the state of the bus is examined. If the state of the bus is not idle, the value of idle_timer is reset to $T_{idle}$ within block 5425. If the state of the bus is idle, then the processing moves to decision block 5430, wherein the value of idle_timer is compared to zero. If idle_timer is equal to zero, then this indicates that the bus has remained in the idle state for $T_{idle}$ seconds, and thus the phase terminates. Accordingly, the processing moves from block 5430 to block 5445 in this case. If the value of idle_timer is positive within block 5430, or the processing visited block 5425, then the decision block 5440 is visited next. Within block 5440, it is determined whether a packet has been received with an END signal. If so, the processing moves accordingly to block 5445. If not, the processing loops back to block 5410. Finally after leaving block 5445, the processing leaves the block 5400 through exit point 5495.

Block 5200: Transmission of Packets During Owned Phase Non-Aggressively

Reference is made to FIG. 10c for discussion of the processing within block 5200. As mentioned above, the function of block 5200 is to manage the transmission of packets during the phase that a particular device adapter owns. From the entry point 5205, the processing moves to decision block 5210, wherein it is determined whether the particular device adapter has any packets to be sent during phase p which it owns. If not, the processing moves through transition 5298 to the entry point 5405 of processing block 5400, wherein the phase is terminated at the appropriate time as described above. If the particular device adapter has packets to transmit during phasep, the processing moves to block 5215. Within block 5215, the timer idle_timer is set to the parameter IPG_LOCAL. As mentioned above, once set to a positive value, idle_timer decrements at the rate of real time until it reaches zero, at which time idle_timer retains the value zero until reset again. The parameter IPG_LOCAL is equal to a value longer than the standard interpacket gap IPG. Within block 5200, the device adapter attempts to avoid collisions with native NRTDs by waiting until the bus is sensed idle for IPG_LOCAL seconds.

Also within block 5215, a variable time_needed_rt is updated. The value of time_needed_rt may be set equal to the maximum time it would take the device adapter to successfully transmit all the remaining real-time packets that are required to be sent during the current phase, assuming that the device adapter does so in the aggressive mode. Thus, this includes transmission times of such packets, as well as the maximum time wasted during collisions with native NRTDs, which collisions are required to cause the native NRTDs to back off and remain silent. The specification of the maximum time required by the device adapter to transmit the remaining real-time packets in the aggressive mode may be selected in accordance with a particular network implementation. The variable time_needed_rt is updated so that it can later be determined if the device adapter should enter the aggressive mode.

Upon leaving block 5215, the processing moves to decision block 5220, wherein the device adapter determines whether to send any more packets within the current phase p. This includes real-time packets as well as non-real-time packets. If not, the processing moves to block 5225 wherein current_phase is incremented by 1, and further to the exit point 5295. In this case, the device adapter would have already transmitted an END signal to the other device adapters 1000, as described below. If within decision block 5220 it is determined that the device adapter wishes to transmit more packets during the current phase p, the processing moves to decision block 5230.

The processing may traverse the cycle of blocks 5230, 5240, 5245, and 5230, or may traverse the cycle of blocks 5230, 5240, 5250, and 5220 until the time that the device adapter observers at least IPG_LOCAL seconds of silence on the bus, or the time it must enter the aggressive mode. Specifically, within block 5230 the sum of current_time and time_needed_rt is compared to the time when phase p must end by, namely, frame_start+$Y_p$. If current_time+time_needed_rt is greater than frame_start+$Y_p$, then the device adapter enters the aggressive mode, and the processing moves through transition 5299 to the entry point 5305 of process block 5300. If, on the other hand, current_time+time_needed_rt is less than or equal to frame_start+$Y_p$, then the device adapter can still attempt to transmit packets in the non-aggressive mode. Accordingly in this case, the processing moves to decision block 5240, wherein the device adapter checks the state of the bus. If the bus is not idle, the processing moves to 5245 where idle_timer is reset to IPG_LOCAL, and the processing loops back to decision block 5230. If the bus is idle within block 5240, then the processing moves to block 5250, where the value of idle_timer is compared with zero. If idle_timer is not equal to zero, then this indicates that the device adapter has not yet observed IPG_LOCAL contiguous seconds of silence, and the processing loops back to decision block 5230. If idle_timer is equal to zero within block 5250, then this indicates that the device adapter has observed IPG_LOCAL contiguous seconds of silence, and that the device adapter is now enabled to send packets. Accordingly, in this case the processing moves to decision block 5260.

Within decision block 5260, the device adapter determines whether the next packet to be sent is the last packet to be transmitted during the current phase p. If not, the processing moves to block 5275 and the packet is transmitted. If so, the processing moves first to block 5265 and the device adapter places an END signal within the next packet to be transmitted, before transmitting the packet in block 5275. If the device adapter has real-time packets to transmit, the device adapter will attempt to transmit such packets before attempting to transmit any of the non-real-time packets it may have to transmit.

After transmitting a packet in block 5275, the processing loops back to block 5215 in order to possibly transmit more packets. After the start of the packet transmission in block 5275, there are two possibilities. First, it is possible that the transmission collides with that of a native NRTD. In this case, the transmission is aborted after the collision is detected, and the device adapter transmits a jam signal so that all stations can reliably determine that a collision occurred. As the transmission is aborted, the value of time_needed_rt will not change in block 5215. If the transmission by the device adapter in block 5275 is successful, then if it was a real-time packet, the variable time_needed_rt is decremented in block 5215.

Block 5500: Management of Interpacket Gap Timer

Figure 10F:
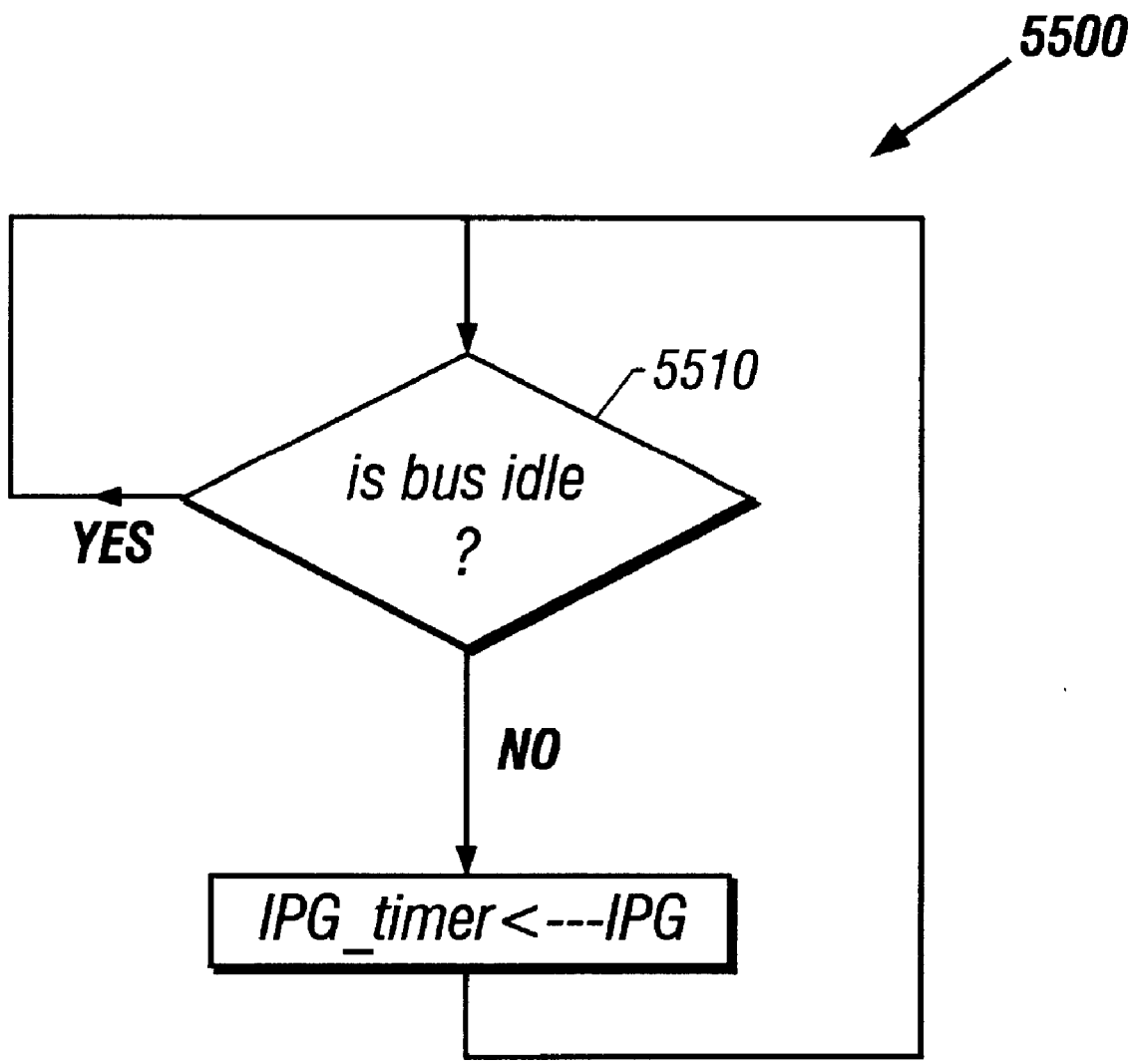

FIG. 10f illustrates a process which runs on a device adapter runs on DA concurrently with the main process described in FIGS. 10a–10e. The purpose of the process is to maintain a timer variable named IPG_timer. As indicated in the figure, the state of the bus is continuously monitored in decision block 5510. Whenever activity is sensed on the bus, the timer IPG_timer is set to a predetermined interpacket gap (IPG), which may be the value of the standard interpacket gap in the Ethernet access protocol. While positive, the value of IPG_timer is decremented at the rate of real-time until a value of zero is reached. Once zero is reached, IPG_timer remains constant until reset to a positive value. Thus, if IPG_timer equals zero at any point in time, then this indicates that the device adapter has observed silence for at least the past IPG seconds relative to the current time. Block 5300: Transmission of Real-Time Packets in Aggressive Mode The process block 5300 is described with reference to FIG. 10d. As mentioned above, the function of block 5300 is to control the timing of the transmission of real-time packets by the device adapter in the aggressive mode during phase p. Upon entering the block through entry point 5305, the processing begins at decision block 5310, where the value of IPG_timer is compared with zero. If IPG_timer is not equal to zero, then the processing loops back to decision block 5310. The processing does not break from decision block until IPG_timer is equal to zero. When IPG_timer is equal to zero, this indicates that IPG seconds of silence have elapsed, and accordingly a packet transmission can start. Accordingly, in this case the processing moves to block 5320.

Within decision block 5320, a variable tx_time_next is referenced. This variable holds the transmission time of the next real-time packet to be transmitted during the current phase. The sum of current_time and tx_time_next is compared to frame_start+$Y_p$. If current_time+tx_time_next is greater than frame_start+$Y_p$, then transmission of the next real-time packet that requires transmission in the current phase would cause the duration of phase to extend beyond time t+$Y_p$, which violates the constraint on the ending time of phase p. Accordingly, in this case, the processing moves through transition 5399 to the entry point 5405 of block 5400, so that the current phase will terminate as required. The transition 5399 is included as a safety valve to ensure that phase p terminates by the required time and will not be traversed under nominal conditions. If current_time+tx_time_next is less than or equal to frame_start+$Y_p$, then there is sufficient time to transmit the next real-time packet within the current phase p, and the processing moves to decision block 5330.

Within decision block 5330, the device adapter determines whether there is only one real-time packet remaining to be sent in the current phase p. If not, the processing moves to 5345 wherein the next real-time packet is transmitted, if so, the device adapter inserts the END signal into the next real-time packet to be transmitted before transmitting the packet in block 5345.

After the packet has begun transmission in 5345, the processing moves to decision block 5340. There are two possibilities for the fate of the packet transmission. If a collision occurs, the transmission is aborted as soon as the collision is detected, and a JAM signal is sent, as in standard Ethernet access protocol. In this case, the processing moves from 5340 back to decision block 5310, so that the packet can be retransmitted. The device adapter does not back off after a collision but instead may try to transmit after waiting only for the bus to remain silent for the standard interpacket gap IPG. If the transmission in block 5345 completes successfully, then the processing moves from block 5340 to decision block 5350.

Within decision block 5350, the device adapter determines whether there are more real-time packets remaining to be transmitted during the current phase p. If so, the processing loops back to decision block 5310, so that the remaining real-time packets may be transmitted. If not, the current phase ends, and accordingly the processing proceeds to 5355, where current_phase is incremented by one, before leaving the block through the exit point 5395.

Block 5100: Transmission of Packets in Free-Access Phase

Referencing FIG. 10*b*, an exemplary implementation of process block 5100 is illustrated. As mentioned above, the function of block 5100 is to transmit packets during the free-access phase according to standard CSMA/CD protocol of Ethernet, while inhibiting transmissions at the end of the phase. The processing enters decision block 5110 after passing through the entry point 5105.

Within decision block 5110, a variable tx_time_next is referenced. This variable holds the transmission time of the next packet to be transmitted during the current phase, and is equal to zero if there is no packet currently queued. The sum of current_time and tx_time_next is compared to frame_start+$Y_{N+1}$. As described above, the free-access phase within the current frame ends at time frame_start+$Y_{N+1}$. Accordingly, if current_time+tx_time_next is greater than or equal to frame_start+$Y_{N+1}$, then the next packet cannot be successfully transmitted within the current free access phase, and the processing moves through transition 5199 to the entry point 5405 of block 5400, where the free-access phase will be terminated as appropriate. If current_time+tx_time_next is less frame_start+$Y_{N+1}$, then the processing moves to decision block 5120.

Once the processing moves to decision block 5120, it is allowable for the device adapter to attempt transmission of a packet. However, it must wait for at least IPG seconds of silence before doing so, and back off from any previous collisions that may have already been suffered by the packet. Accordingly, within decision block 5120, the device adapter tests to determine whether IPG_timer is equal to zero and backoff_timer is equal to zero. If so, the device adapter has observed IPG seconds of silence and is through backing off from any previous collisions that may have occurred, and thus proceeds to decision block 5130. If not, the processing loops back to decision block 5110.

Within decision block 5130, the device adapter determines whether there is a packet waiting to be transmitted. If not, the processing loops back to decision block 5110. If so, the processing moves to 5140 and the packet is transmitted.

After the packet has begun transmission in block 5140, the processing moves to decision block 5150. There are two possibilities for the fate of the packet transmission. If a collision occurs, the transmission is aborted as soon as the collision is detected, and a JAM signal is sent, as in the standard Ethernet access protocol. In this case the processing moves from 5150 to block 5170. Within block 5170, the timer backoff_timer is set to a random retransmisison delay as in the standard truncated binary exponential back-off algorithm within the Ethernet protocol. In particular, if a packet has experienced k collisions, then backoff_timer is set to iT, where T is the slot time and i is a random integer in the range $0 \leq i < 2^m$ and m=min{k, 10}. After a packet has experienced 16 collisions, the packet is discarded. Note that as long as the timer backoff_timer remains positive, backoff_timer decrements at the rate of real time until it reaches zero. When zero is reached, backoff_timer retains the value of zero until reset to a positive value. Thus, when backoff_timer=0, the device adapter is through backing_off from any previous collisions that may have occurred. If the transmission in block 5140 was successful, then the processing moves from block 5140 to block 5160, where the backoff_timer is set to zero. From either block 5160 or block 5170, the processing loops back to decision block 5110 so that the next transmission or retransmission can proceed if possible within the free-access phase.

During the free-access phase, it may be preferable for the device adapter 1000 to use a longer interpacket gap, IPG_LOCAL, in order to avoid collisions with other device adapters 1000 and native NRTDs, thereby surrendering priority to native NRTDs. The necessary modifications to process block 5100 in order to implement this will be apparent to someone skilled in the art.

Transmission Processing for Conditioned Mode: Variable Length Phases

If the network is configured in Conditioned mode rather than Annex mode, then no collisions are possible during owned phases, so that it is unnecessary for a particular device adapters to defer by using a longer interpacket gap within the phase p that it owns. In this case, the processing can be optimized by setting the parameter IPG_LOCAL, defined within processing block 5200, to the standard interpacket gap IPG. In the conditioned mode, the process block 5300 will not be entered under nominal conditions. Preferably, a device adapter 1000 can automatically detect whether or not the network is configured in Conditioned mode or Annex mode by detecting collisions during owned phases, for example, and set the value of IPG_LOCAL accordingly.

Transmission Processing for Conditioned Mode: Fixed Length Phases

If it is desired to operate the system with fixed-length phases as illustrated in FIG. 5, then the processing described in block 5400 may be modified accordingly. Specifically, block 5415 can be eliminated, and from the entry point 5405, the processing moves directly to decision block 5410. Blocks 5420, 5425, 5430, and 5450 can be eliminated, and instead of moving from block 5410 to block 5420 when the answer is "no" in block 5410, the processing loops back to block 5410 in this case. Alternatively the same structure as illustrated in FIG. 10e can be used, with the parameter $T_{idle}$ set to a large value, so that the phase does not terminate due to silence. Also, the transmission and reception of END signals may be omitted.

Timing Errors

In the above descriptions, each of the device adapters had knowledge of the common time reference, and propagation delays were ignored. If the timing error is bounded by e in the sense described above, then the operation of the timing mechanisms is modified by putting "guard times" between owned phases to prevent different device adapters from colliding. The guard times should be the summation of at least e and the maximum propagation delay between two stations in the network. In a hub-based local network, each the device adapters 1000 may estimate their propagation delay to the hub by measuring the delay from the time a signal is sent to the hub to the time the signal is looped back to the device adapter 1000. The device adapters 1000 may accordingly adjust their transmissions so that the guard times between owned phases can be reduced. The modifications to the preferred embodiments to take into account timing errors will be apparent to someone skilled in the art.

Obtaining a Common Time Reference

An exemplary mechanism to acquire a common time reference is as follows. Device adapter DA1 is designated as a leader. The leader is periodically required to transmit a control packet during a first phase. All of the device adapters synchronize to the time reference of the leader by starting a timer after the carrier sense signal is lost after the transmission of the control packet. In case the control packet is transmitted late relative to the time reference of the leader due to deference to a NRTD packet, the leader can explicitly write the lateness of the packet (e.g., in units of nanoseconds) into the end of the control packet. The other device adapters can use this lateness to adjust the timers accordingly. Analogous to the description above, each of the device adapters 1000 may estimate their propagation delay to the hub, and this information can be used to fine tune the estimates, thereby increasing the accuracy of each device adapter's estimate of the common time reference. The modifications to the preferred embodiments to obtain a common time reference will be apparent to someone skilled in the art.

Dynamic Operation

In the arbitration mechanisms described above, each device adapter 1000 in the network owned a phase in every frame. If a device adapter 1000 is not actively carrying any real-time traffic (e.g., a telephone is on hook), the device adapter may be desirable to de-allocate the phase owned by this inactive device adapter. Using non-real-time packets, the device adapters 1000 may coordinate to agree on how many phases are in each frame and on the ownership of the phases. Each device adapter 1000, active or not, may be periodically required to transmit a packet announcing its existence. Each device adapter 1000 may then maintain a table of device adapter that have announced their existence, which entries expire if a corresponding announcement is not heard before a timer expires. The addresses of the device adapters in this table then define a natural ordering between the device adapters 1000 in the network, which can be used define the order of ownership of owned phases during a frame, and to define the leader.

In addition to Ethernet networks, the principles of the present invention may be applied in conjunction with networks operating in accordance time division multiple access (TDMA) or synchronous optical network (SONET) protocols. For example, asynchronous transfer mode SONET (ATM/SONET) networks transmit large frames with predetermined fixed time slots at regular intervals. A SONET frame may be received on an OC3 line by a device adapter 1000 and converted into or configured as a packet in an assigned phase of the present invention. For example, the time slots of the SONET frame may be assigned to respective device adapters from a remote Conditioned sub-network (i.e., a network connected to a device adapter 1000 of the invention). In addition, a free-access phase may be added to the end of the incoming SONET phase, and a guard phase may be added to the beginning of the frame. Accordingly, the device adapters 1000 of the present invention are not only compatible with conventional network hardware but also provide compatibility across network protocols.

Those skilled in the art will understand that the embodiments of the present invention described above exemplify the present invention and do not limit the scope of the invention to these specifically illustrated and described embodiments. The scope of the invention is determined by the terms of the appended claims and their legal equivalents, rather than by the described examples. In addition, the exemplary embodiments provide a foundation from which numerous alternatives and modifications may be made, which alternatives and modifications are also within the scope of the present invention as defined in the appended claims.

What is claimed is:

1. A network for communicating packets of data, comprising:
   a network medium;
   a plurality of devices for generating packets of data for transmission on said network medium; and
   a plurality of device adapters each including:
   a device interface for connecting to one of said devices and for receiving said packets generated thereby;
   a network interface for connecting to said network medium; and
   a processor connected to said interfaces for transmitting said packets received at said device interface to said network interface;
   said plurality of device adapters creating a frame of time, said frame being substantially synchronized in said plurality of device adapters and repeating periodically, said frame of time including a plurality of time phases;
   each of said device adapters having at least one of said time phases assigned uniquely thereto and transmitting said packets received at said device interface to said network medium during said time phase assigned thereto; and said plurality of time phases including a free-access phase during which each of said device adapters is able to contend for access to the network medium and transmit said packets.

2. A network as claimed in claim 1 wherein said plurality of phases includes a guard phase during which none of said device adapters is able to transmit said packets.

3. A network as claimed in claim 1 wherein each of said phases has a predetermined length of time.

4. A network as claimed in claim 3 wherein said length of time of each said phase is variable.

5. A network as claimed in claim 3 wherein said length of time of each said phase varies proportionally with an amount of said data in said packets received at said device interface of a respective said device adapter.

6. A network as claimed in claim 1 wherein said processor of each said device adapter inserts an END signal in a last packet transmitted from said packets received at said device interface to signify an end of said phase assigned thereto.

7. A network as claimed in claim 1 wherein said plurality of devices includes a real-time device for generating real-time packets of data.

8. A network as claimed in claim 7 wherein said plurality of devices includes a non-real-time device for generating non-real-time packets of data.

9. A network as claimed in claim 8 wherein said device adapters transmitting said real-time packets during said phase respectively assigned thereto and said non-real-time packets during said free-access phase.

10. A network as claimed in claim 9 wherein said device adapters transmit said non-real-time packets during said phase respectively assigned thereto in the absence of said real-time packets.

11. A network as claimed in claim 1 wherein said plurality of devices includes a native non-real-time device connected to said network medium and for generating non-real-time packets of data.

12. A network as claimed in claim 11 wherein said native non-real-time device is able to transmit said non-real-time packets during any of said plurality of phases.

13. A network as claimed in claim 1 wherein each of said device adapters includes a clock.

14. A network as claimed in claim 13 wherein said plurality of device adapters includes a master device adapter for providing a signal for synchronizing said clocks of said plurality of device adapters.

15. A network as claimed in claim 14 wherein said signal is transmitted periodically.

16. A network as claimed in claim 14 wherein said clocks drift over time;
said signal being transmitted as necessary to correct for said drift.

17. A device adapter for regulating traffic in a broadcast network, the broadcast network including devices for generating packets of data and a network medium for carrying the packets, said device adapter comprising:
a device interface for connecting to one of the devices and for receiving packets of data generated thereby;
a network interface for connecting to the network medium; and
a processor connected to said interfaces for receiving packets from said device interface and for transmitting packets to the network interface;
said device adapter having a time reference which is substantially synchronized with that of other said device adapters connected to the broadcast network, said time reference defining a frame of time, said frame including a plurality of time phases, said frame repeating periodically; said plurality of time phases including a free-access phase;
said device adapter having one of said time phases being uniquely assigned thereto; and
said processor of said device adapter transmitting packets received at said device interface during said time phase assigned thereto and during said free-access phase.

18. A device adapter as claimed in claim 17 wherein said plurality of phases includes a guard phase during which said processor unable to transmit packets received at said device interface.

19. A device adapter as claimed in claim 17 further comprising a memory connected to said processor for storing packets prior to transmission.

20. A device adapter as claimed in claim 17 wherein said processor inserts an END signal in a last packet transmitted from packets received at said device interface to signify an end of said phase assigned thereto.

21. A device adapter as claimed in claim 17 wherein said device interface is connected to a real-time device for generating real-time packets of data.

22. A device adapter as claimed in claim 21 further comprising a second device interface for connecting to a non-real-time device for generating non-real-time packets of data.

23. A device adapter as claimed in claim 22 wherein said processor transmits said real-time packets during said phase assigned thereto and said non-real-time packets during said free-access phase.

24. A device adapter as claimed in claim 23 wherein said processor transmits said non-real-time packets during said phase respectively assigned thereto in the absence of said real-time packets.

25. A device adapter as claimed in claim 17 further comprising a clock.

26. A device adapter as claimed in claim 25 wherein said processor receives a signal on said network interface for synchronizing said clock with that of other said device adapters connected to the broadcast network.

27. A device adapter as claimed in claim 25 wherein said processor transmits a signal on said network interface for synchronizing said clocks of other said device adapters connected to the broadcast network.

28. A device adapter as claimed in claim 27 wherein said processor transmits said signal periodically.

29. A device adapter as claimed in claim 27 wherein said processor transmits said signal at a predetermined interval to compensate for drift in said clocks.

30. A method for regulating traffic in an network including devices for generating packets of data, a network medium for carrying the packets, and a plurality of device adapters connected between the devices and the network medium, said method comprising the steps of:
defining a common time reference for the device adapters, said common time reference including a frame of time having a plurality of time phases, each device adapter being uniquely assigned to one of said plurality of time phases, said plurality of time phases including a free-access phase;
allowing a device adapter to transmit packets during said time phase uniquely assigned thereto and during said free-access phase; and
cyclically repeating said frame.

31. A method as claimed in claim 30 further comprising the steps of:
  defining a guard phase in said plurality of phases of said frame; and
  preventing each of the device adapters from transmitting packets during said guard phase.

32. A method as claimed in claim 30 further comprising the steps of:
  defining each of said plurality of phases to have a length of time; and
  varying said lengths of time in proportion to a number of packets to be transmitted respectively by the device adapters.

33. A method as claimed in claim 30 further comprising the step of:
  inserting an END signal in a last packet to be transmitted by one of the device adapters to end of the phase assigned thereto.

34. A method as claimed in claim 30 further comprising the step of:
  synchronizing said device adapters.

35. A method as claimed in claim 34 wherein said synchronizing step comprises the step of:
  transmitting a signal to each of the device adapters.

36. A method as claimed in claim 35 wherein said signal is transmitted periodically.

37. A method as claimed in claim 35 wherein said signal is transmitted at a predetermined interval to compensate for drift in clocks of the device adapters.

38. A method as claimed in claim 30 wherein the network includes a real-time device connected to a device adapter for generating real-time packets and a non-real-time device connected directly to the network medium for generating non-real-time packets, said method further comprising the step of:
  allowing the non-real-time device to transmit the non-real-time packets during any of the phases.

39. A method as claimed in claim 38 further comprising the step of:
  allowing a device adapter to transmit a real-time packet to force a collision with the non-real-time packet when there is not sufficient time for said real-time packet to meet a delivery deadline.

40. A method as claimed in claim 39 wherein interpacket gaps are defined between said phases, said method further comprising the step of:
  reducing said interpacket gap when a collision occurs; and
  retransmitting said real-time packet.

41. A network for communicating packets of data, comprising:
  a network medium;
  a plurality of devices for generating packets of data for transmission on said network medium; and
  a plurality of device adapters each including:
    a device interface for connecting to one of said devices and for receiving said packets generated thereby;
    a network interface for connecting to said network medium; and
    a processor connected to said interfaces for transmitting said packets received at said device interface to said network interface;
    said plurality of device adapters creating a frame of time, said frame being substantially synchronized in said plurality of device adapters and repeating periodically, said frame of time including a plurality of time phases;
    each of said device adapters having at least one of said time phases assigned uniquely thereto and transmitting said packets received at said device interface to said network medium during said time phase assigned thereto; and
    said plurality of time phases including a guard phase during which none of said device adapters is able to transmit said packets.

42. A network as claimed in claim 41 wherein said plurality of phases includes a free-access phase during which each of said device adapters is able to transmit said packets.

* * * * *

UNITED STATES PATENT AND TRADEMARK OFFICE
CERTIFICATE OF CORRECTION

PATENT NO. : 6,215,797 B1  
DATED : April 10, 2001  
INVENTOR(S) : Ronald D. Fellman and Rene L. Cruz Page 1 of 1

It is certified that error appears in the above-identified patent and that said Letters Patent is hereby corrected as shown below:

Please correct the name of the Assignee to read "Path 1 Network Technologies, Inc."

Signed and Sealed this

Nineteenth Day of February, 2002

*Attest:*

*Attesting Officer*

JAMES E. ROGAN  
*Director of the United States Patent and Trademark Office*